United States Patent
You et al.

(10) Patent No.: US 11,438,817 B2
(45) Date of Patent: Sep. 6, 2022

(54) METHOD FOR DYNAMIC TRP SWITCHING BASED ON DCI, AND TERMINAL USING SAME

(71) Applicant: LG ELECTRONICS INC., Seoul (KR)

(72) Inventors: Hyangsun You, Seoul (KR); Hyunsoo Ko, Seoul (KR); Seonwook Kim, Seoul (KR); Duckhyun Bae, Seoul (KR); Joonkui Ahn, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/033,643

(22) Filed: Sep. 25, 2020

(65) Prior Publication Data

US 2021/0105683 A1    Apr. 8, 2021

(30) Foreign Application Priority Data

Sep. 26, 2019 (KR) .................. 10-2019-0118682

(51) Int. Cl.
*H04W 36/06* (2009.01)
*H04W 68/00* (2009.01)
*H04W 76/15* (2018.01)
*H04W 72/04* (2009.01)

(52) U.S. Cl.
CPC ......... *H04W 36/06* (2013.01); *H04W 68/005* (2013.01); *H04W 72/042* (2013.01); *H04W 76/15* (2018.02)

(58) Field of Classification Search
CPC . H04W 36/06; H04W 68/005; H04W 72/042; H04W 76/15; H04W 68/00; H04W 72/04; H04L 5/0053; H04B 7/024
USPC ........................................... 370/331
See application file for complete search history.

(56) References Cited

U.S. PATENT DOCUMENTS

| | | | |
|---|---|---|---|
| 11,006,403 B2* | 5/2021 | Zhang | H04L 5/0053 |
| 11,038,727 B2* | 6/2021 | Khoshnevisan | H04B 7/024 |
| 11,201,711 B2* | 12/2021 | Tsai | H04L 5/0035 |
| 2019/0342907 A1* | 11/2019 | Huang | H04L 5/0053 |
| 2020/0045700 A1* | 2/2020 | Sun | H04L 5/0053 |
| 2020/0077369 A1* | 3/2020 | Zhang | H04W 72/048 |
| 2020/0178272 A1* | 6/2020 | Khoshnevisan | H04L 5/0094 |
| 2020/0229161 A1* | 7/2020 | Raghavan | H04W 72/042 |
| 2020/0313729 A1* | 10/2020 | Zhou | H04L 5/0091 |
| 2020/0313819 A1* | 10/2020 | Zhou | H04B 7/0617 |
| 2020/0351055 A1* | 11/2020 | Manolakos | H04W 56/001 |
| 2020/0351841 A1* | 11/2020 | Cirik | H04L 5/0048 |
| 2020/0351892 A1* | 11/2020 | Yi | H04W 72/042 |
| 2021/0014837 A1* | 1/2021 | Papasakellariou | H04W 72/042 |
| 2021/0050934 A1* | 2/2021 | Khoshnevisan | H04L 1/0013 |

(Continued)

*Primary Examiner* — Man U Phan
(74) *Attorney, Agent, or Firm* — Lee Hong Degerman Kang Waimey

(57) ABSTRACT

The present document provides a method for receiving information informing a transmission configuration indicator (TCI) change in a wireless communication system, the method performed by a user equipment (UE) and comprising: performing an initial access procedure with a network, receiving the information informing the TCI change from a first transmission reception point (TRP) in the network, performing a physical downlink control channel (PDCCH) monitoring based on the information informing the TCI change.

6 Claims, 25 Drawing Sheets

(56) References Cited

U.S. PATENT DOCUMENTS

| 2021/0099898 A1* | 4/2021 | You ........................ H04L 5/0053 |
| 2021/0306867 A1* | 9/2021 | Hamidi-Sepehr ... H04W 72/042 |
| 2021/0352629 A1* | 11/2021 | Haghighat ............ H04L 1/1896 |
| 2021/0378045 A1* | 12/2021 | Zhang .................. H04B 7/0617 |

\* cited by examiner

FIG. 17

Transmit information notifying TCI change to terminal — S1710

METHOD FOR DYNAMIC TRP SWITCHING BASED ON DCI, AND TERMINAL USING SAME

CROSS-REFERENCE TO RELATED APPLICATIONS

Pursuant to 35 U.S.C. §119 (a), this application claims the benefit of earlier filing date and right of priority to Korean Patent Application No. 10-2019-0118682, filed on Sep. 26, 2019, the contents of which are all hereby incorporated by reference herein in its entirety.

FIELD OF THE DISCLOSURE

The present specification relates to wireless communication.

RELATED ART

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Meanwhile, the present specification intends to provide a structure for dynamically allocating uplink (UL)/downlink (DL) resources of a terminal (or UE) via DCI.

SUMMARY OF THE DISCLOSURE

According to an embodiment of this specification, provided herein is a method for receiving information notifying TCI change and performing physical downlink control channel (PDCCH) monitoring based on the information notifying TCI change.

According to the present specification, since a terminal (or UE) may dynamically receive indications of UL/DL directions from multiple TRPs having the same cell ID, efficient data transmission and/or reception may be performed.

Effects that may be achieved from the detailed examples of the present specification will not be limited only to the effects listed above. For example, various technical effects that can be understood or derived from the present specification by a person having ordinary skill in the related art may exist. Accordingly, the detailed effects of the present specification will not be limited only to those explicitly specified in the present specification and may include various effects that may be understood or derived from the technical characteristics (or features) of the present specification.

BRIEF DESCRIPTION OF THE DRAWINGS

FIG. 17 is a flow chart of a method for receiving information notifying Transmission Configuration Indicator (TCI) change, in view of the TRP, according to an embodiment of the present specification.

DESCRIPTION OF EXEMPLARY EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, and C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, parentheses used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

Technical features described individually in one drawing in the present specification may be individually implemented, or may be simultaneously implemented.

Figure 1:
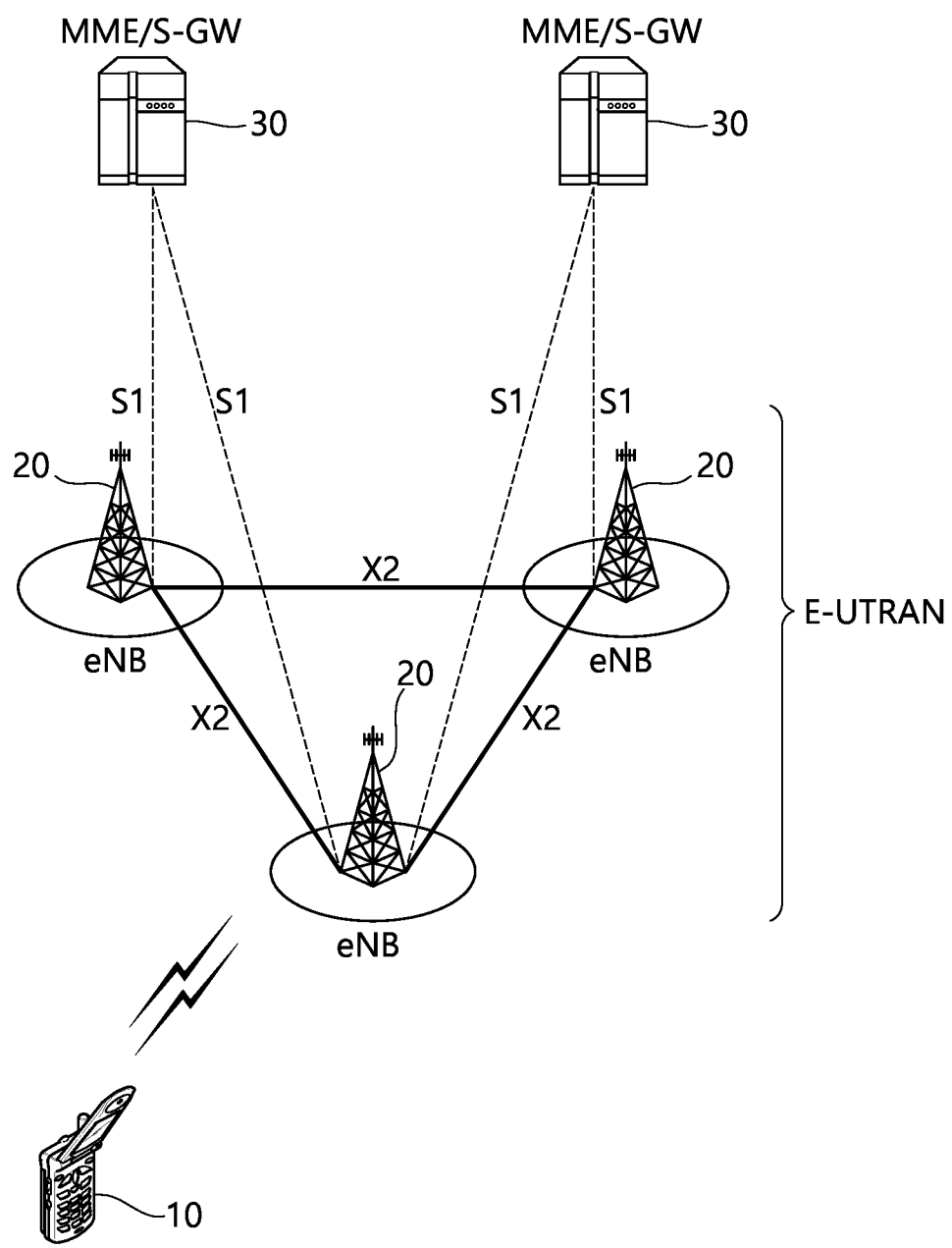
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
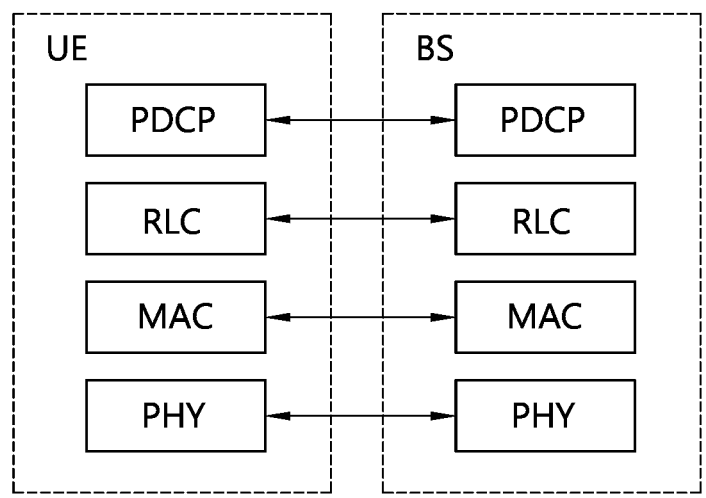
FIG. 2 is a diagram showing a wireless protocol architecture for a user plane.
Figure 3:
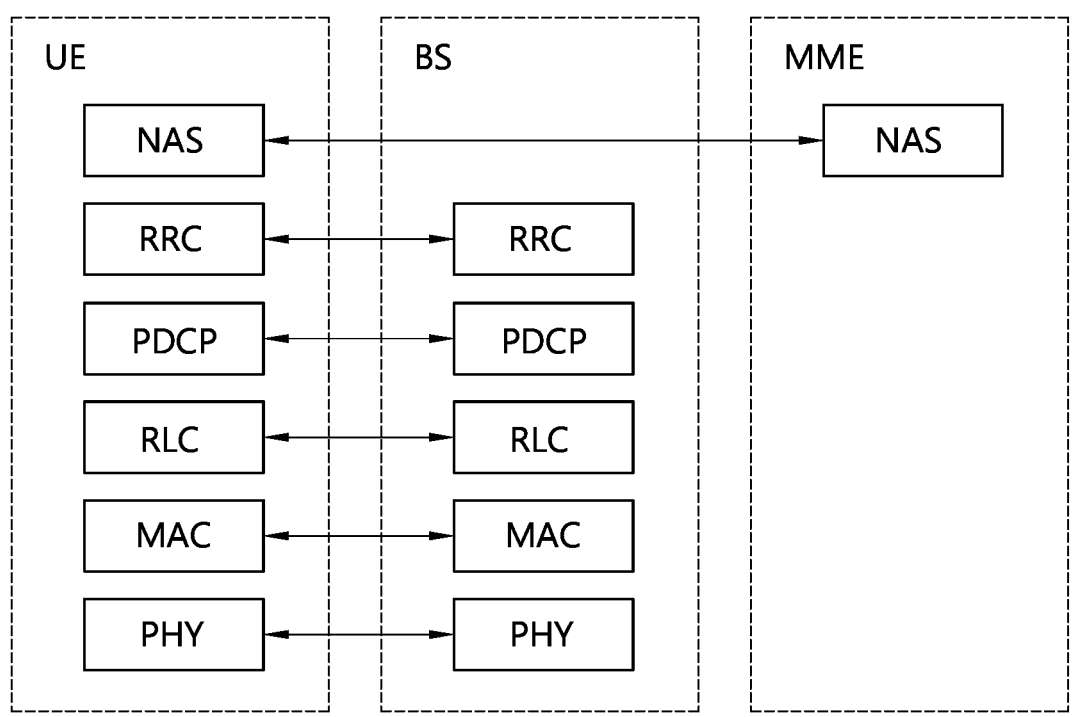
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel A Transmission Time Interval (TTI) is a unit time for subframe transmission.

Hereinafter, a new radio access technology (new RAT (NR)) will be described in detail.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Figure 4:
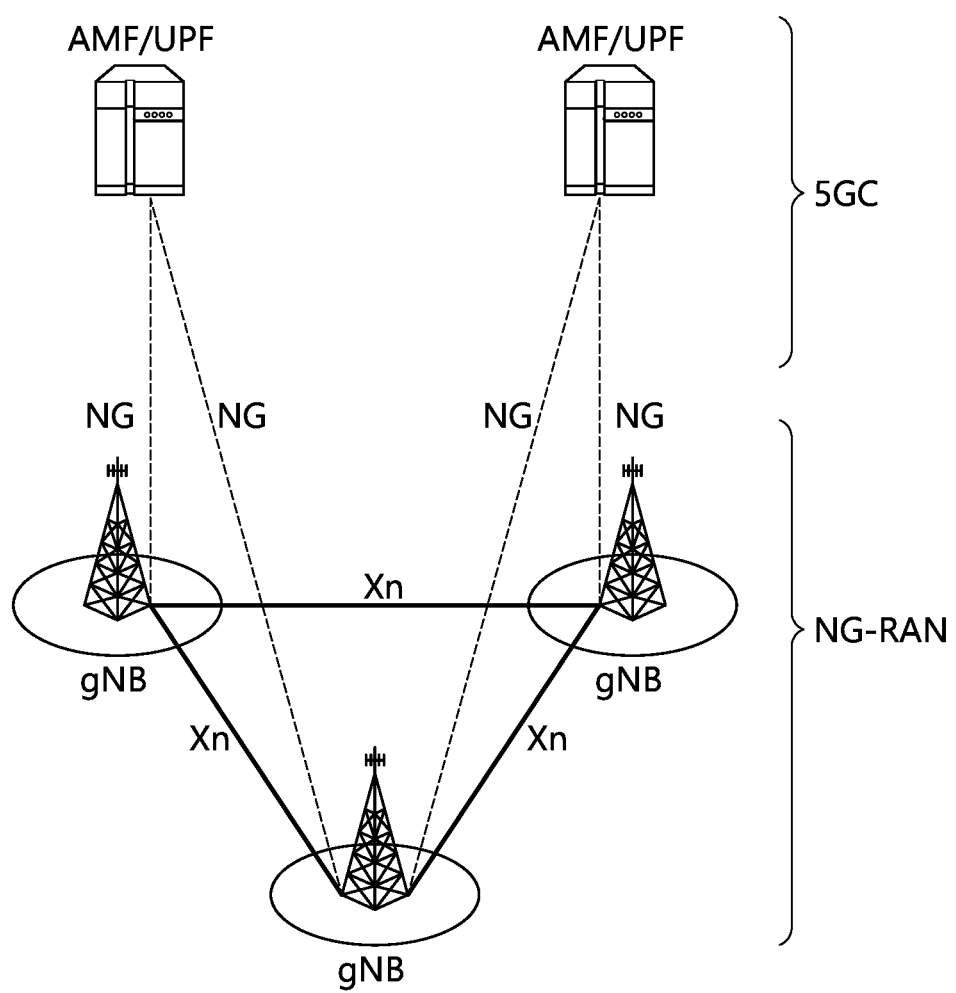
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
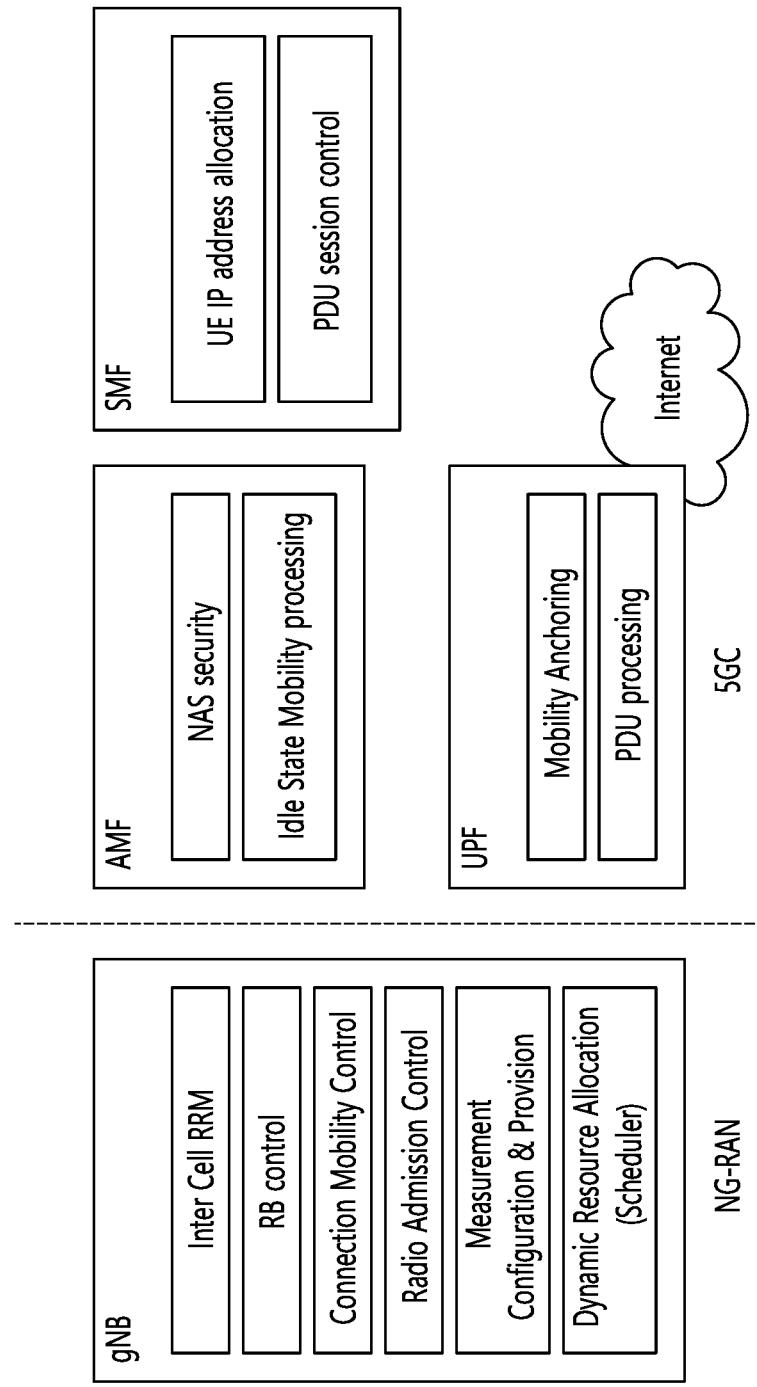
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
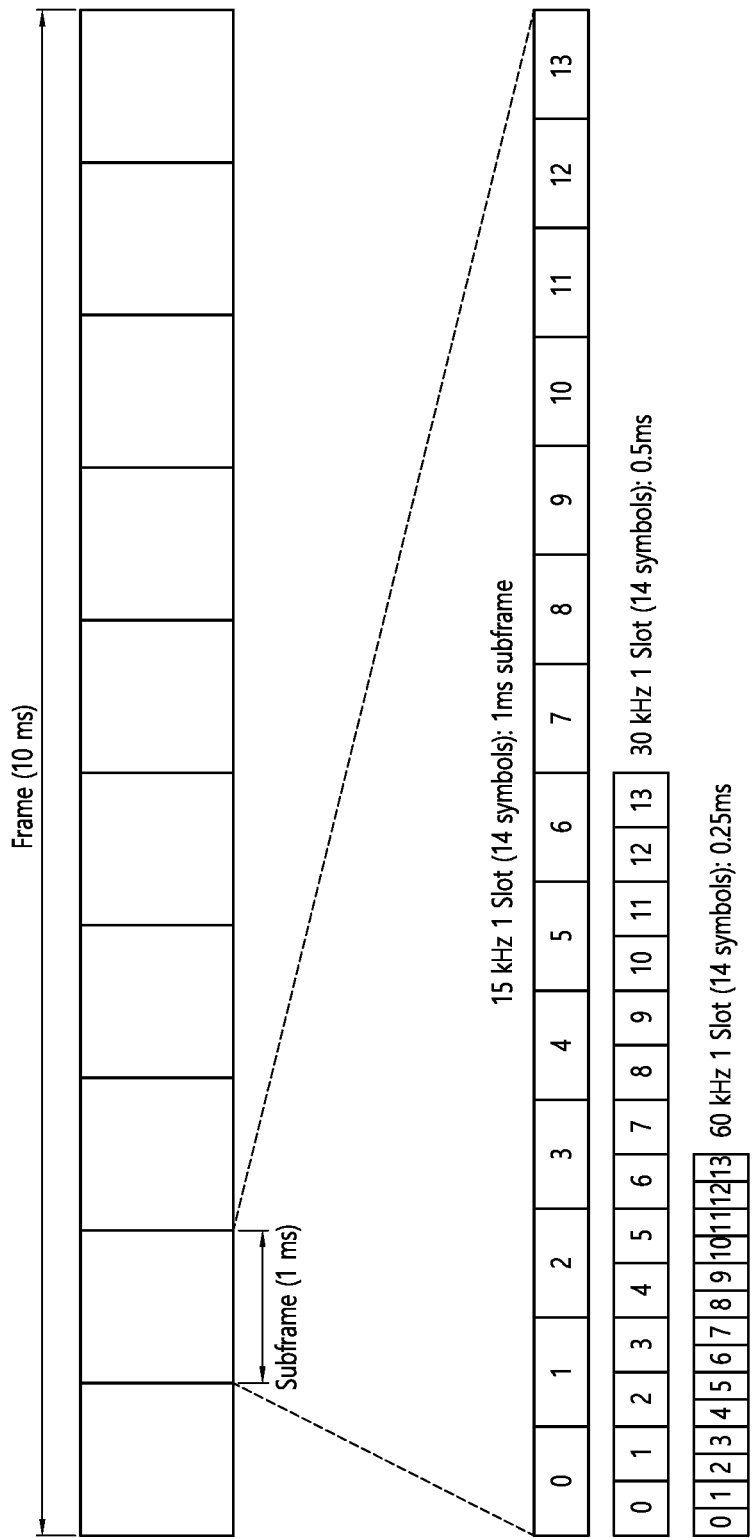
FIG. 6 illustrates an exemplary frame structure that can be applied in NR.

FIG. 6 illustrates an exemplary frame structure that can be applied in NR.

Referring to FIG. 6, a frame may be configured of 10 milliseconds (ms), and the frame may include 10 subframes each being configured of 1 ms.

One or more slots may be included in a subframe in accordance with subcarrier spacing.

Table 1, which is presented below, shows examples of subcarrier spacing configuration $\mu$.

TABLE 1

| $\mu$ | $\Delta f = 2^{\mu} \cdot 15[kHz]$ | Cyclic Prefix (CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

Table 2, which is presented below, shows examples of a number of slots within a frame (Nframeμslot), a number of slots within a subframe (Nsubframeμslot), a number of symbols within a slot (Nslotsymb), and so on, according to the subcarrier spacing configuration $\mu$.

TABLE 2

| $\mu$ | $N^{slot}_{symb}$ | $N^{frame, \mu}_{slot}$ | $N^{subframe, \mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows an example for $\mu$=0, 1, 2. A physical downlink control channel (PDCCH) may be configured of one or more control channel elements (CCEs) as shown below in Table 3.

TABLE 3

| Aggregation level | Number of CCEs |
| --- | --- |
| 1 | 1 |
| 2 | 2 |
| 4 | 4 |
| 8 | 8 |
| 16 | 16 |

That is, PDCCH may be transmitted through resource being configured of 1, 2, 4, 8 or 16 CCEs. Herein, a CCE may be configured of 6 resource element groups (REGs), and one REG is configured of one resource block within the frequency domain and one orthogonal frequency division multiplexing (OFDM) symbol within the time frequency. In NR, the following technology/features may be applied.

<Self-Contained Subframe Structure>

Figure 7:
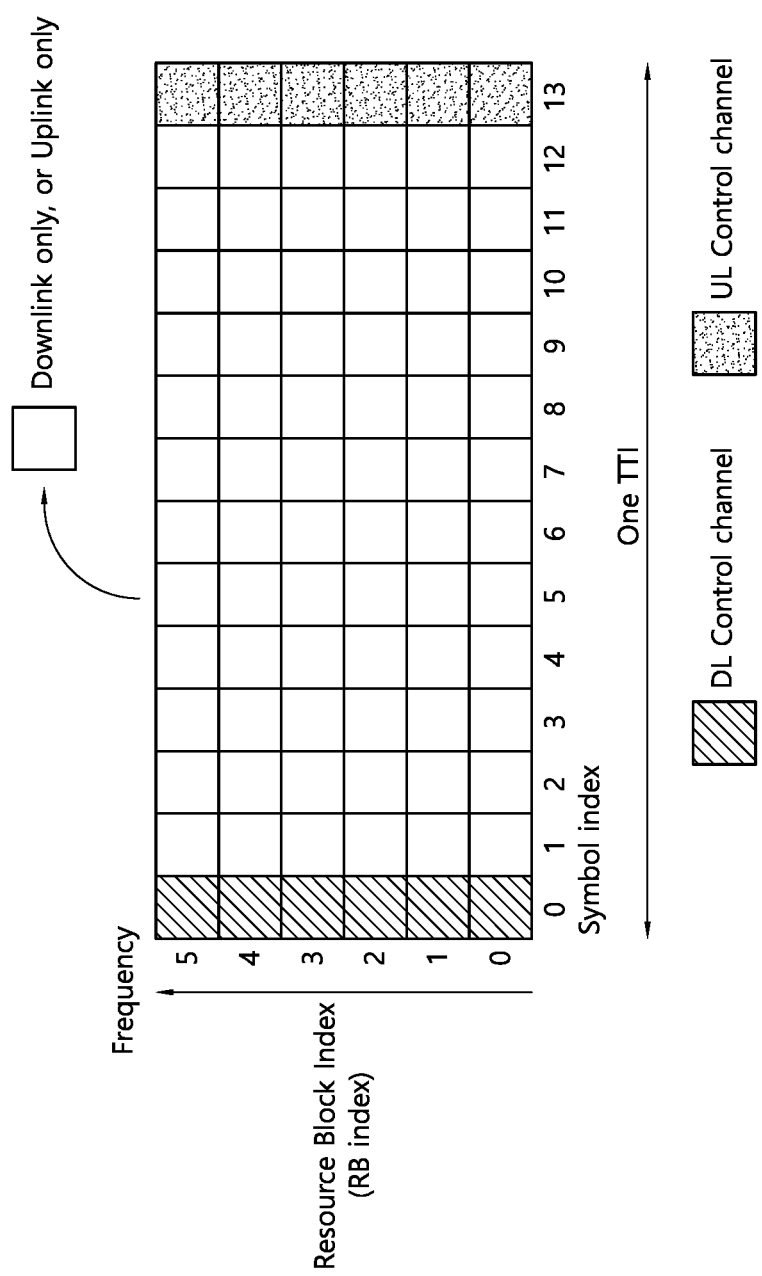
FIG. 7 illustrates an example of a frame structure for the new radio access technology (new RAT).

FIG. 7 illustrates an example of a frame structure for the new radio access technology (new RAT).

In NR, as a purpose for minimizing latency, as shown in FIG. 7, a structure having a control channel and a data channel being processed with Time Division Multiplexing (TDM), within one TTI, may be considered as a type of a frame structure.

In FIG. 7, an area marked with slanted lines represents a downlink control area, and an area marked in black represents an uplink control area. An area having no marking may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process from a transmission mode and a reception mode of the base station and terminal (or UE), or a transition process from a reception mode and a transmission mode of the base station and terminal (or UE). For this, in a self-contained subframe structure, some of the OFDM symbols of a time point where a transition from DL to UL occurs may be configured as a guard period (GP).

Figure 8:
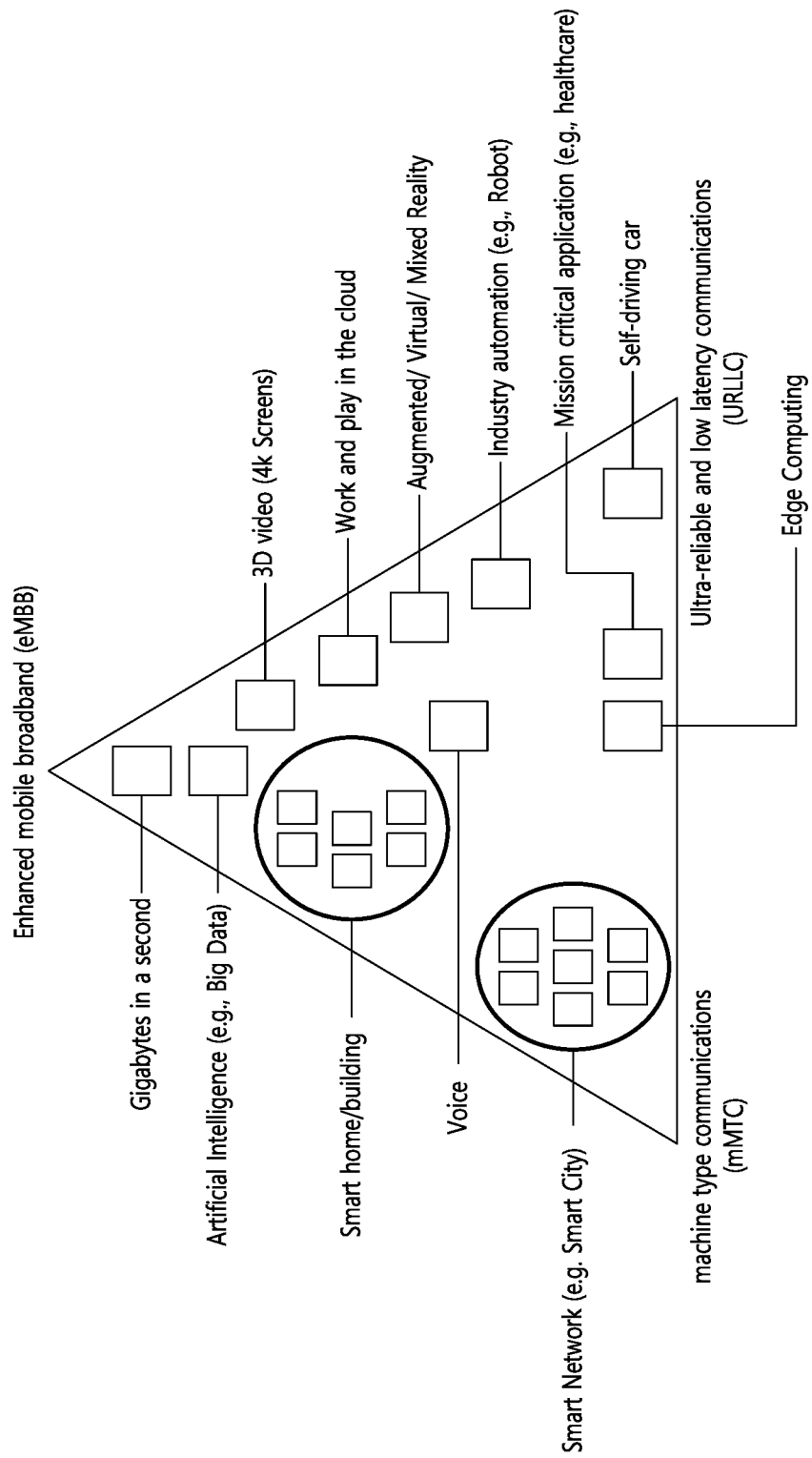
FIG. 8 shows examples of 5G usage scenarios to which the technical features of the present specification can be applied.

FIG. 8 shows examples of 5G usage scenarios to which the technical features of the present specification can be applied. The 5G usage scenarios shown in FIG. 8 are only exemplary, and the technical features of the present specification can also be applied to other 5G usage scenarios which are not shown in FIG. 8.

Referring to FIG. 8, the three main requirements areas of 5G include (1) enhanced mobile broadband (eMBB) domain, (2) massive machine type communication (mMTC) area, and (3) ultra-reliable and low latency communications (URLLC) area. Some usage cases may require multiple areas for optimization and, other usage cases may only focus on only one key performance indicator (KPI). 5G is to support these various usage cases in a flexible and reliable method.

eMBB focuses on overall enhancements to the data rate, latency, user density, capacity and coverage of mobile broadband access. The eMBB aims approximately 10 Gbps of throughput. eMBB far surpasses basic mobile Internet access and covers abundant interactive work and media and entertainment applications in cloud and/or augmented reality. Data is one of the key drivers of 5G, and it may be the first time not to be able to see dedicated voice services in the 5G era. In 5G, the voice is expected to be processed as an application program by simply using data connection provided by the communication system. The main cause of increased traffic capacity (or size) is an increase in content size and an increase in the number of applications requiring high data rates. Streaming services (audio and video), interactive video and mobile Internet connectivity will become more common as more devices become connected to the Internet. Many of these applications require always-on connectivity to push real-time information and notifications to the user. Cloud storage and applications are growing rapidly in mobile communication platforms, which can be applied to both work and entertainment. Cloud storage is a special usage case that drives the growth of uplink data rate. 5G is also used for remote tasks on the cloud and requires much lower end-to-end delay to maintain excellent user experience when tactile interface is used. In entertainment, for example, cloud games and video streaming are another key factor that increases the demand for mobile broadband capabilities. Entertainment is essential in smartphones and tablets at any place, including high mobility environment such as trains, cars and airplanes. Another usage case is augmented reality and information search for entertainment. Herein, augmented reality requires very low latency and instantaneous data capacity (or size).

mMTC is designed to enable communication between numerous low-cost battery-driven devices that are intended to support applications such as smart metering, logistics, and field and body sensors. mMTC aims approximately 10 years on battery and/or approximately 1 million devices per 1 km2. mMTC allows seamless integration of embedded sensors in all areas and is one of the most widely expected 5G usage cases. Potentially, by 2020, the number of IoT devices is expected to reach 20.4 billion. Industrial IoT is one of the areas where 5G plays a key role in enabling smart cities, asset tracking, smart utility, agriculture and security infrastructures.

By enabling devices and machines to communicate with ultra-reliability, very low latency and high availability, URLLC is ideal for vehicular communication, industrial control, factory automation, remote surgery, smart grids and public safety applications. URLLC aims approximately 1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Hereinafter, a plurality of usage cases included in the triangle of FIG. 8 will be described in more detail.

5G may complement fiber-to-the-home (FTTH) and cable-based broadband (or DOCSIS) as a means of delivering streams evaluated from hundreds of megabits per second to gigabits per second. This high speed may be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator in order to minimize latency (or delay).

Automotive is expected to become an important new driver for 5G, with many usage cases for mobile communications to vehicles. For example, entertainment for passengers demands high capacity and high mobile broadband at the same time. This is because future users will continue to expect high-quality connections regardless of their location and speed. Another usage case in the automotive field is an augmented reality dashboard. The driver may be capable of identifying an object in the dark on top of what is being viewed through the front windshield through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices carried by pedestrians). The safety system allows the driver to guide the alternative course of an action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level that cannot be achieved by humans.

Smart cities and smart homes, which are referred to as smart societies, will be embedded in high density wireless sensor networks. The distributed network of intelligent sensors will identify conditions for cost and energy-efficient maintenance of a city or house. A similar setting may be performed for each home. Temperature sensors, windows and heating controllers, theft alarms, and home appliances are all wirelessly connected. Many of these sensors typically require low data rate, low power and low cost. However, for example, real-time HD video may be required for specific types of devices for monitoring.

The consumption and distribution of energy, including heat or gas, is highly dispersed, requiring automated control of distributed sensor networks. The smart grid interconnects these sensors using digital information and communication technologies to collect and act in accordance with the collected information. Such information may include supplier and consumer behavior, allowing the smart grid to improve the distribution of fuel, such as electricity, in terms of efficiency, reliability, economy, production sustainability, and automated methods. The smart grid may be viewed as another sensor network with low latency.

The field of health has many applications that can benefit from mobile communication. Communication systems may support telemedicine in order to provide clinical care in remote locations. This may help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires wireless connections to operate with similar latency (or delay), reliability, and capacity as cables and their management to be simplified. Low latency and very low error probabilities are new requirements that need to be connected to 5G.

Logistics and freight tracking are important usage cases of mobile communications that enable tracking of inventory and packages at any location using location-based information systems. Usage cases of logistics and freight tracking typically require low data rates, but require a large range and reliable location information.

Hereinafter, the proposal of the present specification will be described in detail.

Additional advantages, objects, and characteristics (or features) of the present specification will be partially described in the following description, and, when examining the following, it shall be apparent to a person having ordinary skill in the related art or may be partially learned from the embodiment of the present specification. The object and other advantages of the present specification may be realized and achieved not only by the appended drawings but also by the scope of the claims of the present specification and, most particularly, by the structure(s) indicated in the scope of the claims.

The terms used in the present specification may be as follows.

IAB-node: a RAN node supporting radio access for terminal(s) (or UE(s)) and supporting wireless backhauling of access traffic.

IAB-donor: a RAN node providing a UE's interface to a core network and providing a backhaul function to IAB-node(s).

Hereinafter, each abbreviation may correspond to the following terms.

IAB: Integrated Access and Backhaul
CSI-RS: Channel State Information Reference Signal
DgNB: Donor gNB
AC: Access
BH: Backhaul
DU: Distributed Unit
MT: Mobile terminal
CU: Centralized Unit
IAB-MT: IAB Mobile Terminal
NGC: Next-Generation Core network
SA: Stand-alone
NSA: Non-stand-alone
EPC: Evolved Packet Core Meanwhile, even if dynamic TDD configuration was designed in Rel-15, only static (or persistent) TDD configuration (i.e., DL:UL=4:1) was actually commercialized. In case of a preferred Macro scenario, in order to prevent interference from occurring between multiple operators within a same band, only the static TDD configuration was authorized. However, in case of a specific usage case (e.g., factory automation, and so on) and other objects (e.g., UL capacity enhancement, and so on), a more flexible UL/DL resource allocation shall be applied.

Additionally, although UE-specific TDD configuration was designed in Rel-15, only a single TDD per cell configuration was assumed in Rel-16 CLI WID. However, in case various types of traffic (e.g., DL heavy eMBB, UL heavy eMBB, URLLC) exist in a cell, the network shall be authorized to be capable of flexibly allocating resources in order to meet with the required traffic. As a candidate solution for meeting with the above-mentioned requirements, a Full Duplex Radio (FDR) may be provided. Additionally, as a candidate scenario for meeting with the above-mentioned requirements, 'ideal Backhaul-based multiple TRPs', in which UL/DL resource allocation per transmission reception point (TRP), may be managed.

Based on the description presented above, enhancements in the flexible TDD configuration may be considered.

Inter TRP having a same cell ID (ideal Backhaul) may be an important scenario for managing flexible U/D resource usage. In this scenario, a network may be operated so that U/D resource can be dynamically allocated per TRP in accordance with the traffic situation. However, CLI (i.e., from TRP to TRP, from UE to UE) may be a bottleneck effect. Therefore, the provision of a CLI processing method may be required.

As a candidate solution, a solution applying inter-UE CLI measurement and reporting, which is being designed in Rel-16, may be considered.

However, since inter-UE CLI measurement and reporting is managed by a semi-static (or semi-persistent) method, this method may not be appropriate for managing the dynamic U/D resource allocation per TRP in a cell. Instead, a faster CLI measurement and reporting system (e.g., L1 signaling-based measurement and reporting) may be needed. CLI processing may be a potential enhancement area.

Additionally, a technology related to another method of UL/DL resource allocation throughout the TRPs (e.g., UL/DL decoupling between TRPs, and so on) may be provided.

Meanwhile, in the current NR system, the UE receives configuration of TDD-UL-DL-ConfigCommon through SI. This is equally applied to all UEs within the same cell via cell-specific U/D resource assignment.

Additionally, the UE receives TDD-UL-DL-ConfigDedicated configuration via RRC. This is a UE-specific U/D resource assignment UE-specifically configures resource direction for resources being assigned as flexible resources through TDD-UL-DL-ConfigCommon. Thereafter, resource direction may be dynamically configured for resources being configured as flexible resources through TDD-UL-DL-ConfigCommon and TDD-UL-DL-ConfigDedicated via SFC-DCI (e.g., DCI Format 2-0).

At this point, for the purpose of coverage enhancement of a cell, CoMP, throughput enhancement of a specific region, and so on, there may exist an environment in which multiple TRPs having the same cell ID exist. In this case, different TRPs each having the same cell ID may use a same TDD-UL-DL-ConfigCommon, and a same TDD-UL-DL-ConfigDedicated may be used for a same UE. In this case, the TRPs has the same semi-static U/D resource assignment for a specific UE, and a resource direction may be dynamically allocated in an area being configured as flexible resources by the semi-static U/D resource assignment of the UE.

At this point, in case UEs having different traffic directions are intermixed within one TRP, it may be inefficient for one TRP to support such UEs at the same time. For example, in an aspect of transmission reducing latency, it will be preferable for a UE that is intended to transmit UL traffic to be assigned with UL heavy resources, and it will be preferable for a UE that is intended to receive DL traffic to be assigned with DL heavy traffic. In this case, since one TRP is incapable of performing DL transmission and UL reception at the same time, the reception of UL traffic and the transmission of DL traffic shall be performed in different time domains.

Conversely, multiple TRPs having the same cell ID may exist, and different U/D resource assignment may be made for the same UE per TRP. In this case, while one TRP is assigned with UL heavy resources and provides services to a UE having a large amount of UL traffic, at the same time, another TRP may be assigned with DL heavy resources and provide services to a UE having a large amount of DL traffic.

In an environment where multiple TRPs each having the same cell ID exist, in case each TRP is capable of being managed with different U/D resource assignments, for example, the following management scenarios may exist.

Figure 9:
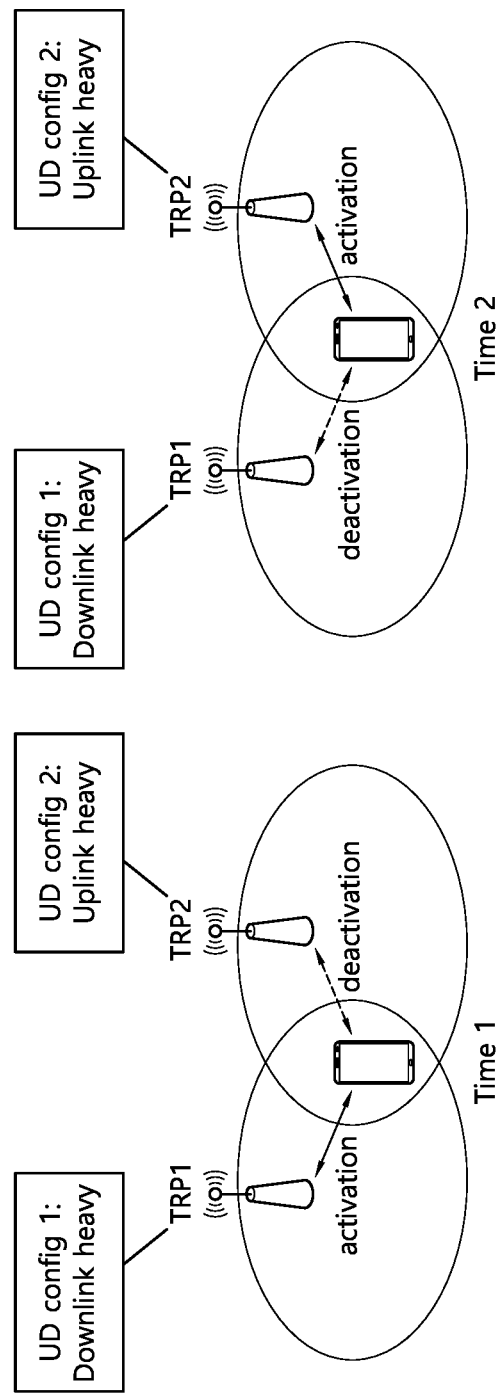
FIG. 9 illustrates a general example for data transmission/reception of multiple TRPs each having the same cell ID.

FIG. 9 illustrates a general example for data transmission/reception of multiple TRPs each having the same cell ID.

As shown in FIG. 9, when multiple TRPs each having the same cell ID exist (TRP1 and TRP2 in the drawing), each TRP may use a different U/D resource assignment. For example, TRP1 may be given a U/D resource assignment wherein the DL resources have greater importance, and TRP2 may be given a U/D resource assignment wherein the UL resources have greater importance.

Therefore, transmission/reception may be performed to a TRP having an appropriate U/D resource assignment in accordance with the traffic situation being transmitted/received to/by the UE. For example, in case the UE receives DL data in a specific time domain, the UE may receive the DL data through TRP1, wherein the DL resources have greater importance, during the required time section (or period). And, in case the UE transmits UL data, the UE may receive UL data through TRP2, where the UL resources have greater importance, during the corresponding time section (or period).

Figure 10:
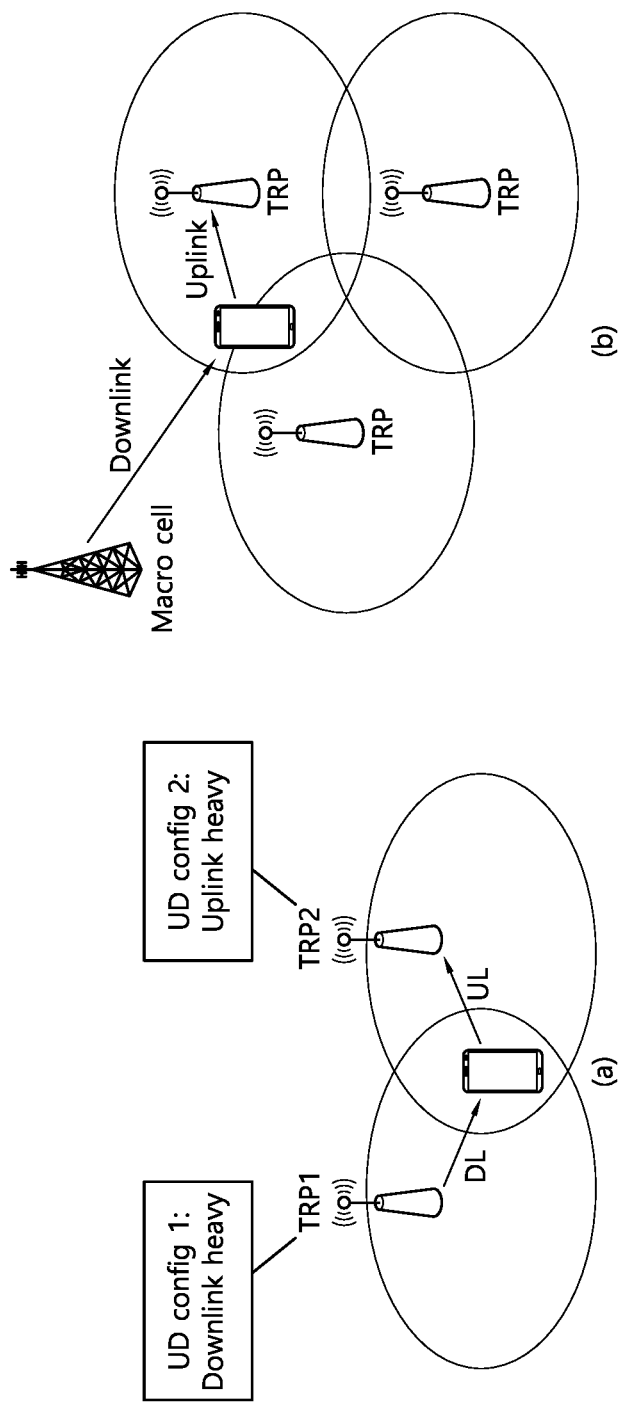
FIG. 10 illustrates another general example for data transmission/reception of multiple TRPs each having the same cell ID.

FIG. 10 illustrates another general example for data transmission/reception of multiple TRPs each having the same cell ID.

As shown in FIG. 10, when multiple TRPs each having the same cell ID exist, a specific TRP may only perform downlink transmission or uplink reception. For example, as shown in FIG. 10, in light of a specific UE, TRP1 may be given a U/D resource assignment wherein the DL resources have greater importance (or a U/D resource assignment wherein only downlink exists), and TRP2 may be given a U/D resource assignment wherein the UL resources have greater importance (or a U/D resource assignment wherein only uplink exists).

As shown in (a) of FIG. 10, when each of TRP1 and TRP2 is respectively given a U/D resource assignment wherein the DL resources have greater importance and a U/D resource assignment wherein the UL resources have greater importance, the UE may perform downlink reception only from TRP1 and may perform uplink transmission only to TRP2. Alternatively, when considering a situation where the coverage of the uplink is generally poorer as compared to the coverage of the downlink, in order to enhance the uplink coverage, as shown in (b) of FIG. 10, the UE may perform downlink reception from a macro cell and may perform uplink transmission to a neighboring TRP that is closely located.

As described above, although the U/D resource assignment that is used by each TRP is maintained, by changing the TRP through which the UE performs communication, as needed, it may be considered to appropriately change the U/D resource assignment that is used by the UE.

Accordingly, in the method for changing the U/D resource assignment being applied by the UE in accordance with the TRP, two details may be broadly considered as described below.

1. A different semi-static U/D resource assignment (e.g., TDD-UL-DL-ConfigCommon and/or TDD-UL-DL-ConfigDedicated) is given per TRP for one UE.

2. A different dynamic U/D resource assignment (e.g., slot format indication by SFI-DCI) is performed per TRP for one UE.

Although the present specification describes a situation where TRPs each having the same cell ID is given a different U/D resource assignment, the content of the present specification also includes being applied to a situation where TRPs each having a different cell ID are given different U/D resource assignments.

Hereinafter, embodiments of the present specification will be described in more detail. The configuration, operation, and other characteristics (or features) of the present specification may be understood by the embodiment(s) of the present specification, which is/are described with reference to the appended drawings.

The present specification proposes a method for configuring a slot format of each TRP by using SFI-DCI, based on an environment where multiple Transmit-Receive Points (TRPs) each having the same cell ID exist, determining a TRP through which a UE is to perform communication and determining a slot format that is to be applied when performing communication.

DCI including information on a resource direction (slot format) that is to be applied by the UE will be referred to as Slot Format Indication-Downlink Control Information (SFI-DCI). And, such DCI may, for example, be DCI Format 2-0.

In light of the UE, multiple TRPs each having the same cell ID may each be given the same semi-static U/D resource assignment. That is, the TRPs are given the same TDD-UL-DL-ConfigCommon and/or TDD-UL-DL-ConfigDedicated. At this point, by receiving SFI-DCI, the UE may receive indication on a slot format being dynamically applied, and/or the UE may determine a TRP that is to perform transmission/reception.

Alternatively, in light of the UE, multiple TRPs each having the same cell ID may each be given a different semi-static U/D resource assignment. That is, the TRPs are each given a different TDD-UL-DL-ConfigCommon and/or TDD-UL-DL-ConfigDedicated. At this point, by receiving SFI-DCI, the UE may receive indication on a slot format being dynamically applied, and/or the UE may determine a TRP that is to perform transmission/reception. In case each TRP is given a different semi-static U/D resource assignment, when SFI-DCI is received for a specific TRP, a dynamic slot format that is received through the SFI-DCI may be reflected and applied to the semi-static U/D resource assignment of the corresponding TRP.

Based on the above-described environment, the present specification proposed operations of the UE for receiving SFI-DCI from a TRP and applying a changed slot format, and, thereafter, performing control/data transmission/reception. The following proposals may be implemented individually or in combination.

Hereinafter, the embodiments of the present specification will be described in detail with reference to the accompanying drawings. The following drawings have been illustrated to describe a detailed example of the present specification. The names of specific devices or names of specific signals/messages/fields being indicated in the drawing are merely presented as examples, and, therefore, the technical characteristics (or features) of the present specification will not be limited only to the detailed names used in the following drawings.

Figure 11:
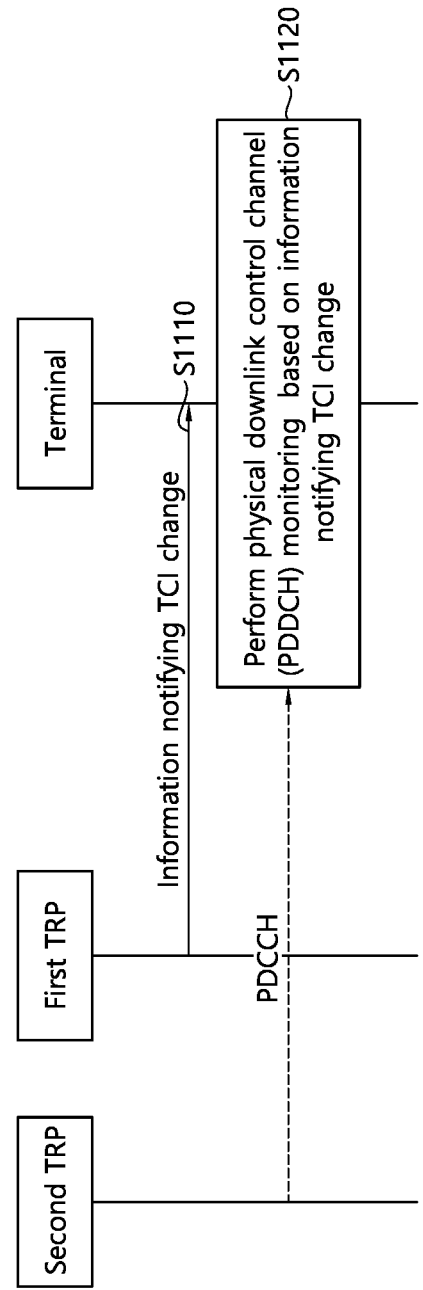
FIG. 11 is a flow chart of a method for receiving information notifying a Transmission Configuration Indicator (TCI) change, according to an embodiment of the present specification.

FIG. 11 is a flow chart of a method for receiving information notifying a Transmission Configuration Indicator (TCI) change, according to an embodiment of the present specification.

According to FIG. 11, a UE (or terminal) may receive information indicating the TCI change from a first transmission reception point (TRP) within a network (S1110).

For example, the TRP of the present specification may not necessarily be a TRP providing RRC signaling. For example, the TRP may be an entity that does not provide RRC signal but provides physical layer signaling. Evidently, in the present specification, the provision of RRC signaling by the TRP will not be excluded.

Although it is not separately illustrated, the TRP of the present specification may correspond to a type of IAM-node. Alternatively, although it is not separately illustrated, although the multiple TRPs of the present specification configure one gNB, the TRBs may be physically separated from one another. In this case, the multiple TRPs may be given the same cell ID, as described above.

Meanwhile, although it is not shown in the drawing, a UE (or terminal) may perform an initial access procedure with a network before receiving information notifying TCI change from a first TRP. In this case, the first TRP (and a second TRP that will be described in detail later on) may be a TRP within the network.

Since a more detailed embodiment of this has already been described above (and will be described later on) in more detail, repeated description of overlapping content will be omitted for simplicity in the description.

The UE (or terminal) may perform physical downlink control channel (PDCCH) monitoring based on the information notifying the TCI change (S1120). Since a more detailed embodiment of this has already been described above (and will be described later on) in more detail, repeated description of overlapping content will be omitted for simplicity in the description.

For example, before receiving the information notifying the TCI change, the UE may perform the PDCCH monitoring based on first TCI. And, after receiving the information notifying the TCI change, the UE may perform the PDCCH monitoring based on second TCI. Since a more detailed embodiment of this has already been described above (and will be described later on) in more detail, repeated description of overlapping content will be omitted for simplicity in the description.

Herein, for example, based on the first TCI, the UE may perform the PDCCH monitoring with the first TRP, and, based on the second TCI, the UE may perform the PDCCH monitoring with the second TRP. Herein, for example, the first TRP and the second TRP may have the same cell ID. Herein, for example, the first TRP may have an uplink-downlink resource allocation that is different from the uplink-downlink resource allocation of the second TRP. Since a more detailed embodiment of this has already been described above (and will be described later on) in more detail, repeated description of overlapping content will be omitted for simplicity in the description.

For example, the UE may receive information notifying the TCI change based on downlink control information (DCI) (herein, as described above, or as will be described later on, DCI may also be referred to as SFI-DCI). Herein, for example, the information notifying the TCI change may be information notifying TCI that is used for performing the PDCCH monitoring. Herein, for example, the UE may perform the PDCCH monitoring on a search space associated with the TCI. Since a more detailed embodiment of this has already been described above (and will be described later on) in more detail, repeated description of overlapping content will be omitted for simplicity in the description.

Hereinafter, the above-described embodiment(s) will be described in more detail. The direction of the description will start with the description of embodiments for A. Activated TRP and SFI-TRP, and, subsequently, embodiments for B. Change in PDCCH monitoring TCI information of the UE will be described. And, finally, embodiments for C. Limitations in SFI-DCI transmission resource will be described.

A. Activated TRP and SFI-TRP

A.1. SFI-TRP

In the present specification, for simplicity in the description, a TRP transmitting SFI-DCI to the UE (or a TRP through which the UE attempts to receive SFI-DCI) will be referred to as SFI-TRP.

SFI-TRP may be interpreted as a TRP through which the UE performs monitoring of a common search space (CSS). The TRP through which the UE performs monitoring of CSS may exist independently from a TRP through which a UE performs monitoring of USS and transmits/receives UE-specific data.

A.2. Activated TRP

A TRP performing UE-specific control/data transmission/reception with a UE is referred to as an Activated TRP.

A slot format that is currently applied by the UE will be referred to as an activated slot format. At this point, the UE may be operated by applying a slot format that is applied by the activated TRP as its own activated slot format.

At this point, a relationship between SFI-TRP and the activated TRP will be described below in A.3.

A.3. TRP Transmitting SFI-DCI

In this section, a TRP that can be SFI-TRP through which the UE performs reception of SFI-DCI will be discussed. In the following content, although the reception of SFI-DCI will be described, the content presented below may also be applied to cases of determining a TRP through which the UE performs monitoring of other cell-specific PDCCH apart from SFI-DCI.

(1) Configuring a Specific TRP as SFI-TRP

Hereinafter, the embodiments of the present specification will be described in detail with reference to the accompanying drawings. The following drawings have been illustrated to describe a detailed example of the present specification. The names of specific devices or names of specific signals/messages/fields being indicated in the drawing are merely presented as examples, and, therefore, the technical characteristics (or features) of the present specification will not be limited only to the detailed names used in the following drawings.

Figure 12:
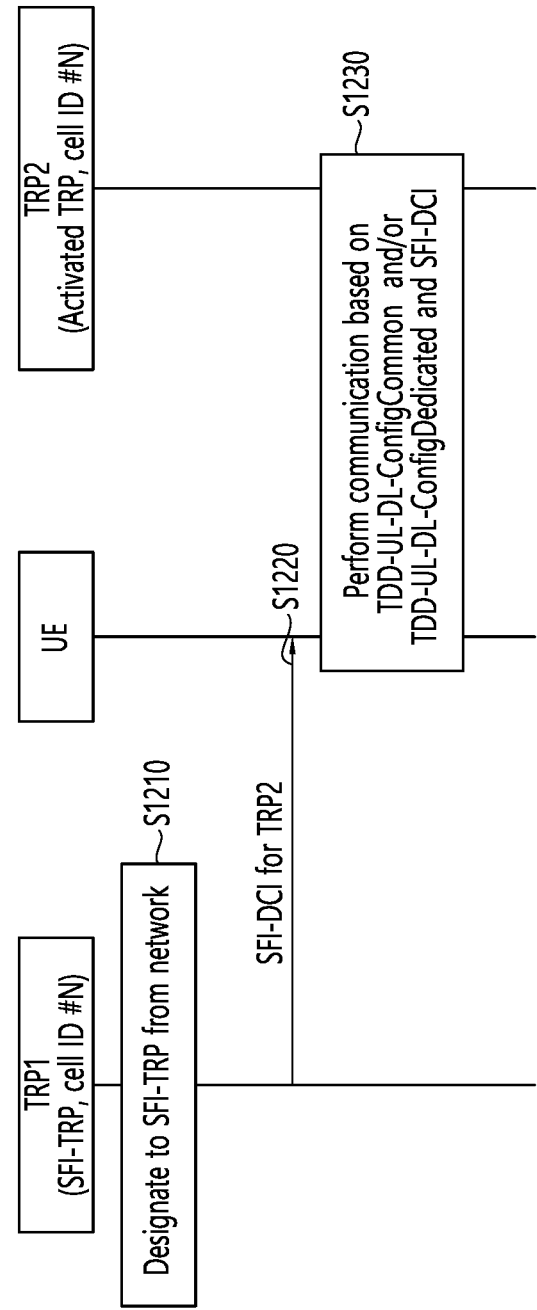
FIG. 12 is a flow chart illustrating a general example of a communication method of a UE in an environment where multiple TRPs exist.

FIG. 12 is a flow chart illustrating a general example of a communication method of a UE in an environment where multiple TRPs exist.

According to FIG. 12, TRP1 may be designated as an SFI-TRP from a network (S1210). Since a more detailed embodiment of this has already been described above (and will be described later on) in more detail, repeated description of overlapping content will be omitted for simplicity in the description.

TRP1 may transmit SFI-DCI for TRP2 to the UE (S1220). Since a more detailed embodiment of this has already been described above (and will be described later on) in more detail, repeated description of overlapping content will be omitted for simplicity in the description.

The UE may perform communication with TRP2 based on TDD-UL-DL-ConfigCommon and/or TDD-UL-DL-ConfigDedicated and SFI-DCI (S1230). Since a more detailed embodiment of this has already been described above (and will be described later on) in more detail, repeated description of overlapping content will be omitted for simplicity in the description.

Hereinafter, this embodiment will be described in more detail. When multiple TRPs capable of performing transmission/reception with a specific UE exist, only a specific TRP may be SFI-TRP. That is, in view of one UE, only a specific TRP may transmit SFI-DCI to the UE. That is, SFI-TRP may exist independently from the activated TRP.

In this case, when multiple TRPs each having the same cell ID exist, although the UE may perform control and/or data transmission/reception through all or some of the corresponding TRPs, the SFI-DCI may be received only through a TRP that is determined as an SFI-TRP. The UE performs control and data transmission/reception with an activated TRP by applying the configured slot format. The SFI-TRP may configure a slot format that is to be used by a TRP, which is intended to perform control and data transmission/reception with the UE, to the UE through SFI-DCI. The network may determine the TRP that is to perform control and data transmission/reception in a specific slot section, and a slot format that is used by the corresponding TRP is configured through the SFI-DCI.

For example, as described above in FIG. 9, TRP1 and TRP2 may be capable of performing transmission/reception with the UE. At this point, TRP1 may be designated as the SFI-TRP. In case TRP1 transmits a slot format of TRP1 via SFI-DCI, TRP1 becomes the activated TRP of the UE, and the configured slot format becomes the activated slot format of the UE. Thus, the UE performs communication with TRP1. In case TRP1 transmits a slot format of TRP2 via SFI-DCI, TRP2 becomes the activated TRP of the UE, and the configured slot format becomes the activated slot format of the UE. Thus, the UE performs communication with TRP2. In this case, the UE monitors and receives SFI-DCI from TRP1, which is the SFI-TRP regardless of the activated TRP.

(2) Existing as Multiple SFI-TRPs

Hereinafter, the embodiments of the present specification will be described in detail with reference to the accompanying drawings. The following drawings have been illustrated to describe a detailed example of the present specification. The names of specific devices or names of specific signals/messages/fields being indicated in the drawing are merely presented as examples, and, therefore, the technical characteristics (or features) of the present specification will not be limited only to the detailed names used in the following drawings.

Figure 13:
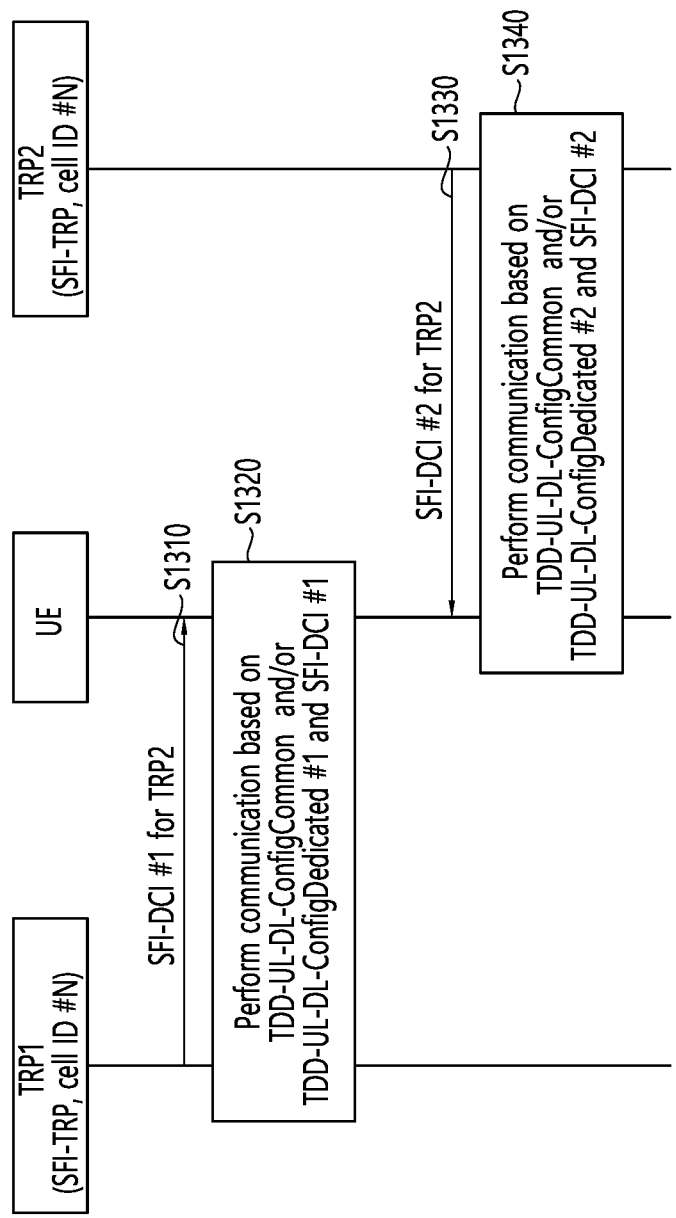
FIG. 13 is a flow chart illustrating a general example of a communication method of a UE in an environment where multiple TRPs exist.

FIG. 13 is a flow chart illustrating a general example of a communication method of a UE in an environment where multiple TRPs exist.

According to FIG. 13, TRP1 may transmit SFI-DCI #1 for TRP1 to the UE (S1310). Since a more detailed embodiment of this has already been described above (and will be described later on) in more detail, repeated description of overlapping content will be omitted for simplicity in the description.

TRP1 may perform communication with the UE based on TDD-UL-DL-ConfigCommon and/or TDD-UL-DL-ConfigDedicated #1 and SFI-DCI #1 (S1320). Since a more detailed embodiment of this has already been described above (and will be described later on) in more detail, repeated description of overlapping content will be omitted for simplicity in the description.

TRP2 may transmit SFI-DCI #2 for TRP2 to the UE (S1330). Since a more detailed embodiment of this has already been described above (and will be described later on) in more detail, repeated description of overlapping content will be omitted for simplicity in the description.

TRP2 may perform communication with the UE based on TDD-UL-DL-ConfigCommon and/or TDD-UL-DL-ConfigDedicated #2 and SFI-DCI #2 (S1340). Since a more detailed embodiment of this has already been described above (and will be described later on) in more detail, repeated description of overlapping content will be omitted for simplicity in the description.

Hereinafter, this embodiment will be described in more detail. All TRPs that may become an activated TRP may be an SFI-TRP.

When multiple TRPs that can perform transmission/reception with a specific UE exist, each TRP may indicate the slot format it will be using to the UE through the SFI-DCI. That is, when a specific UE intends to transmit/receive data by using Slot Format 1, TRP1 may transmit the SFI-DCI configuring Slot Format 1 to the UE and may perform data transmission/reception with the UE by using Slot Format 1. When a specific UE intends to transmit/receive data by using Slot Format 2, TRP2 may transmit the SFI-DCI configuring Slot Format 2 to the UE and may perform data transmission/reception with the UE by using Slot Format 2. In this case, the UE may apply the most recently received SFI-DCI as its activated slot format and may perform transmission/reception with the TRP, which has transmitted the SFI-DCI.

For example, TRP1 and TRP2 may be capable of performing transmission/reception with the UE. At this point, in case TRP1 transmits a slot format of TRP1 by using SFI-DCI, TRP1 becomes the activated TRP of the UE, and the configured slot format becomes the activated slot format of the UE. Thus, the UE performs communication with TRP1. In case TRP2 transmits a slot format of TRP2 by using SFI-DCI, TRP2 becomes the activated TRP of the UE, and the configured slot format becomes the activated slot format of the UE. Thus, the UE performs communication with TRP2. In this case, the UE monitors and receives SFI-DCI from multiple TRPs regardless of the activated TRP.

(3) Configuring an Activated TRP as SFI-TRP

When multiple TRPs capable of performing transmission/reception with a specific UE exist, a TRP performing transmission/reception with the UE during a specific time section (or period) will be referred to as an activated TRP. In this case, the activated TRP may become the SFI-TRP. That is, the UE assumes that SFI-DCI is transmitted from the activated TRP and may perform monitoring of the SFI-DCI.

For example, TRP1 and TRP2 may be capable of performing transmission/reception with the UE. At this point, in case the activated TRP of the UE transmits the slot format of TRP1 by using the SFI-DCI, TRP1 becomes the activated TRP of the UE, and the configured slot format becomes the activated slot format of the UE. Thus, the UE performs communication with TRP1. In case TRP2 transmits a slot format of TRP2 by using SFI-DCI, TRP2 becomes the activated TRP of the UE, and the configured slot format becomes the activated slot format of the UE. Thus, the UE performs communication with TRP2. In this case, the UE monitors and receives SFI-DCI from the currently activated TRP.

B. Change in PDCCH Monitoring TCI Information of the UE

Figure 14:
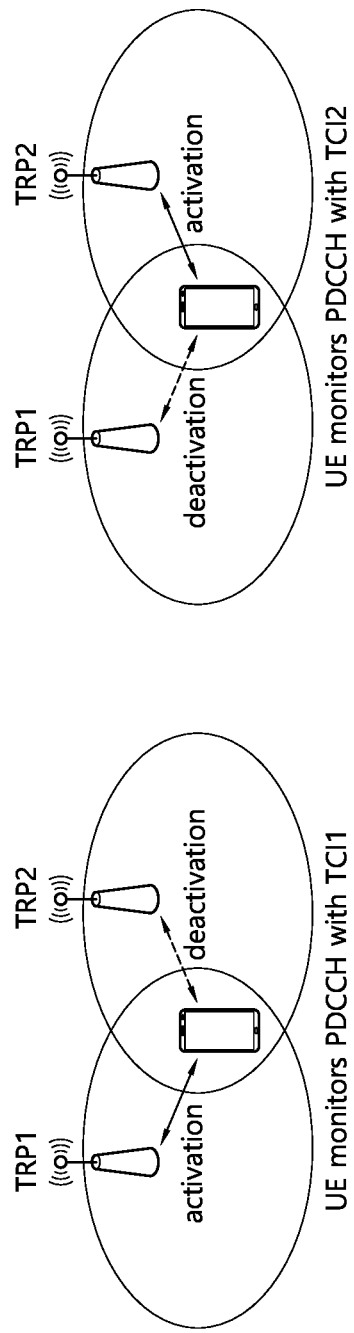
FIG. 14 illustrates a general example of performing communication with a TRP based on specific TCI.

FIG. 14 illustrates a general example of performing communication with a TRP based on specific TCI.

As shown in FIG. 14, when the UE performs communication with TRP1 at a specific time point and then performs communication with TRP2 at a different time point, the UE may receive configuration of a slot format that is to be used by TRP2 through SFI-DCI. Afterwards, the UE may perform control/data transmission/reception with TRP2 by applying the changed slot format.

That is, the UE may receive indication of its activated slot format by receiving the SFI-DCI and may change its activated TRP.

The UE monitors the UE-specific PDCCH (and cell-specific PDCCH) from its activated TRP. In the following description, the PDCCH may denote a PDCCH being monitored by the UE from the activated TRP.

The activated TRP of the UE is not explicitly indicated and changed but is implicitly changed through TCI information receiving the PDCCH. In order to allow the UE to receive the PDCCH from TRP1 and then receive the PDCCH from TRP2, the UE shall receive the PDCCH by using TCI that is appropriate for reception from TRP2. Such TCI may be different from the TCI that was initially used by the UE for the PDCCH reception from TRP1. For example, as shown in (a) of FIG. 14, when the activated TRP is TRP1, the UE receives the PDDCH by using TCI1, and, as shown in (b) of FIG. 14, when the activated TRP is changed to TRP2, the UE may have to receive the PDCCH by using TCI2. That is, in accordance with the change in the activated TRP, the reception of the PDCCH shall be attempted by using TCI that is appropriate for the activated TRP.

Based on the above-described case, the present specification proposes determining and changing the TCI information that receives the PDCCH by using the following method.

B.1. Method for Changing TCI Information of the PDCCH

As the activated TRP transmitting the PDCCH to the UE is dynamically changed, the following method may be used for changing the information of the TCI of the PDCCH that is monitored by the UE.

(a) A search space where the UE monitors the PDCCH may be changed. That is, according to the activated TRP information or TCI information, the UE may turn ON/OFF (perform or not perform) monitoring of a specific PDCCH search space. The ON or OFF state of each PDCCH search space may be determined in accordance with the activated TRP information or TCI information of the search space.

For example, when Search Space 1 and Search Space 2 exist, Search Space 1 may be configured of CORESET 1 that is linked to TCI1, and Search Space 2 may be configured of CORESET 2 that is linked to TCI2. Therefore, when the activated TRP of the UE is TRP1, monitoring of Search Space 1 is turned ON and then monitoring is performed. And, when the activated TRP of the UE is TRP2, monitoring of Search Space 2 is turned ON and then monitoring is performed. In other words, when the activated TRP of the UE is TRP1, Search Space 2 may be turned OFF and monitoring may not be performed. And, when the activated TRP of the UE is TRP2, Search Space 1 may be turned OFF and monitoring may not be performed.

(b) A CORESET configuring a search space being monitored by the UE may be changed. That is, after configuring multiple CORESETs that may be linked to one search space, a CORESET that is actually being linked may be changed in accordance with the activated TRP information or TCI information. The CORESET configuring a search space being monitored by the UE may be changed to a CORESET that is linked to TCI that is appropriate for the activated TRP. For example, CORESET 1 and CORESET 2 may exist, and CORESET 1 may be linked to TCI1, and CORESET 2 may be linked to TCI2. Therefore, when the activated TRP of the UE is TRP1, the CORESET configuring the search space being monitored by the UE is CORESET 1. And, when the activated TRP of the UE is TRP2, the CORESET configuring the corresponding search space may be changed to CORESET 2.

(c) TCI being linked to the CORESET configuring a search space being monitored by the UE may be changed. That is, after configuring multiple TCI states that may be linked to one CORESET, a TCI state that is actually being linked may be changed in accordance with the activated TRP information or TCI information. That is, the TCI being linked to the CORESET configuring the PDCCH search space being monitored by the UE may be changed to TCI that is appropriate for the activated TRP.

For example, when the activated TRP of the UE is TRP1, the CORESET configuring a search space being monitored by the UE is linked to TCI1. And, when the activated TRP of the UE is TRP2, the TCI being linked to the CORESET configuring the corresponding search space may be changed to TCI2.

B.2. Method for Determining Change in TCI Information of the PDCCH

The UE may determine and change the TCI information of the PDCCH monitored by the UE in accordance with the following conditions and signals.

(1) The UE may perform monitoring of the SFI-DCI by using multiple SFI-RNTIs. A gNB may configure, to the UE, multiple SFI-RNTIs for which the UE may perform monitoring. At this point, the activated TRP of the UE may be determined/changed in accordance with the SFI-RNTI of the SFI-DCI that is detected by the UE. Alternatively, a PDCCH search space index that is to be monitored by the UE, a CORESET configuring the search space, or TCI being linked to the CORESET configuring the search space may be determined/changed in accordance with the SFI-RNTI of the SFI-DCI that is detected by the UE.

(2) The activated TRP information of the UE may be included in the SFI-DCI, which is received by the UE, and may then be transmitted. Alternatively, a PDCCH search space index that is to be monitored by the UE, a CORESET configuring the search space, or TCI being linked to the CORESET configuring the search space may be included in the SFI-DCI, which is received by the UE, and may then be transmitted.

(3) The UE may monitor the SFI-DCI by using multiple search spaces. At this point, the activated TRP of the UE may be determined/changed in accordance with the search space in which the UE has detected the SFI-DCI. Alternatively, a PDCCH search space index that is to be monitored by the UE, a CORESET configuring the search space, or TCI being linked to the CORESET configuring the search space may be determined/changed in accordance with the search space in which the UE has detected the SFI-DCI.

(4) The UE may monitor the SFI-DCI by using multiple search spaces. At this point, the CORESET may be determined/changed to the CORESET of the PDCCH search space that is monitored by the UE in accordance with the CORESET configuring the search space in which the UE has detected the SFI-DCI. Alternatively, the TCI being linked to the CORESET of the PDCCH search space being monitored by the UE may be determined/changed to the TCI being linked to the CORESET configuring the search space where the UE has detected the SFI-DCI.

(5) The UE may monitor the SFI-DCI by using multiple search spaces each being located in different BWPs. At this point, the activated TRP of the UE may be determined/changed in accordance with a BWP location/index in which the search space where the UE has detected the SFI-DCI is located. Alternatively, a PDCCH search space index that is to be monitored by the UE, a CORESET configuring the search space, or TCI being linked to the CORESET configuring the search space may be determined/changed in accordance with a BWP location/index in which the search space where the UE has detected the SFI-DCI is located. Alternatively, the UE may monitor only the search space existing in the BWP location/index in which the search space where the UE has detected the SFI-DCI is located.

In case the activated TRP of the UE is configured/determined and then changed by using the above-described methods, and so on, since the search space index that is to be used for monitoring, a CORESET configuring the search space, or TCI being linked to the CORESET configuring the search space is predetermined in advance, by the UE, in the PDCCH for each activated TRP, as described above in B.1, the TCI information of the PDCCH being monitored by the UE may be changed.

Alternatively, in case a PDCCH search space index that is to be monitored by the UE, a CORESET configuring the search space, or TCI being linked to the CORESET configuring the search space is configured/determined and then changed by using the above-described methods, and so on, since the PDCCH search space index, the CORESET configuring the search space, or the TCI being linked to the CORESET configuring the search space that is to be applied by the UE is determined, as described above in B.1, the TCI information of the PDCCH being monitored by the UE may be changed.

At this point, the PDCCH having its TCI information changed may be limited to part of the PDCCH. That is, when the TCI information of the PDCCH being monitored by the UE is changed by using the above-described methods, and so on, among the search spaces being monitored by the UE, the TCI information may be changed for only part (or some) of the search spaces. For example, as proposed above, the TCI information may be changed only for the UE-specific search space.

In case the UE monitors the SFI-DCI by using multiple search spaces, resources between PDCCH candidates each belonging to a different search space may partially or fully overlap. In this case, there may occur a situation where it is difficult for the UE to determine to which search space the corresponding SFI-DCI belongs. In this case, the PDCCH candidate for a specific search space may be given the higher priority. That is, if resources of PDCCH Candidate 1 and PDCCH Candidate 2 each belonging to a different search space overlap, the UE assumes that a PDCCH candidate belonging to a specific search space exists and that no other candidate exists. Such specific search space may, for example, be a search space given a smallest index value or a search space that is to be given a greatest index value.

C. Limitations in SFI-DCI Transmission Resource

In case of a Type3-PDCCH CSS resource through which the SFI-DCI is transmitted, resources that are not semi-statically configured as DL may be included.

An object of applying different slot formats between TRPs may include achieving adaptation to a traffic direction of a supporting UE by configuring resources so that DL or UL resources can be given greater importance within one RTP.

At this point, in order to allow a resource direction between TRPs to maximize other resources, the size of semi-statically and flexibly configured resources shall be large. In this case, the size of resources being semi-statically configured as DL may be decreased, and the likelihood of a resource configuring the Type3-PDCCH CSS to include semi-static and flexible resource may increase. In this case, a problem may occur in that the UE, which has performed data transmission/reception by using the slot format, wherein the UL resources have greater importance, as the activated slot format, may have difficulty in easily receiving the SFI-DCI due to a decrease in the resources capable of receiving the Type3-PDCCH CSS.

In case the resources of Type3-PDCCH CSS include resources that are not configured as semi-static DL, limitations may occur in the resource that enables the SFI-TRP to actually transmit the SFI-DCI within the Type3-PDCCH CSS resources in accordance with the slot format that is currently used by the UE, and the UE shall transmit the SFI-DCI based on the resource area capable of performing reception. When considering such situation of complexity and misalignment for slot formats between the SFI-TRP and the UE, it is proposed herein that the resources configuring the Type3-PDCCH CSS shall include only semi-static DL resources.

Alternatively, for the UE, which has performed data transmission/reception by using the slot format, wherein UL resources have greater importance, as the activated slot format, since resources capable of receiving Type3-PDCCH CSS are reduced, the UE may not be capable of easily receiving the SFI-DCI, the Type3-PDCCH CSS resources may not be configured as semi-static UL or may not be dynamically designated as UL.

Effects that may be achieved from the detailed examples of the present specification will not be limited only to the effects listed above. For example, various technical effects that can be understood or derived from the present specification by a person having ordinary skill in the related art may exist. Accordingly, the detailed effects of the present specification will not be limited only to those explicitly specified in the present specification and may include various effects that may be understood or derived from the technical characteristics (or features) of the present specification.

Meanwhile, content applying the above-described examples shall be described in view of the UE as follows.

The following drawings have been illustrated to describe a detailed example of the present specification. The names of specific devices or names of specific signals/messages/fields being indicated in the drawing are merely presented as examples, and, therefore, the technical characteristics (or features) of the present specification will not be limited only to the detailed names used in the following drawings.

Figure 15:
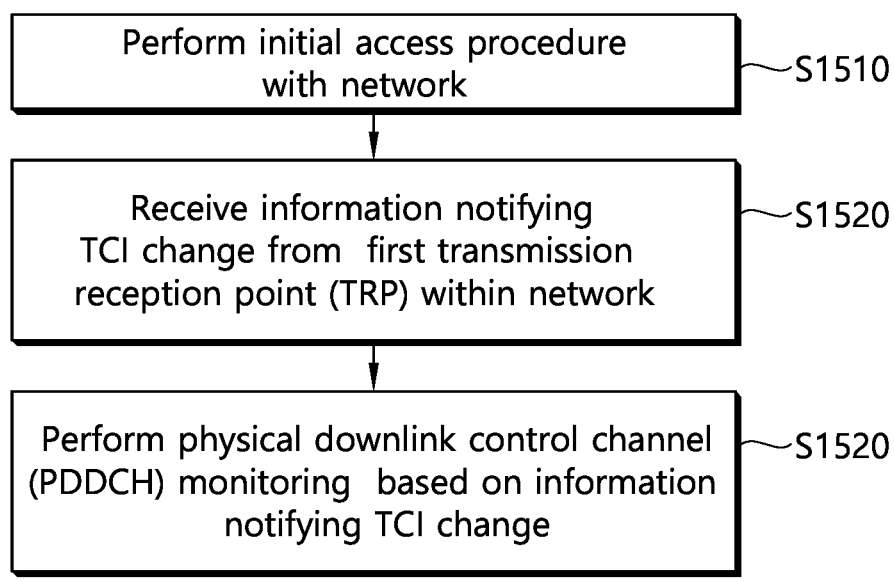
FIG. 15 is a flow chart of a method for receiving information notifying Transmission Configuration Indicator (TCI) change, in view of the UE, according to an embodiment of the present specification.

FIG. 15 is a flow chart of a method for receiving information notifying Transmission Configuration Indicator (TCI) change, in view of the UE, according to an embodiment of the present specification.

According to FIG. 15, the UE (or terminal) may perform an initial access procedure with a network (S1510). Since a more detailed embodiment of this has already been described above (and will be described later on) in more detail, repeated description of overlapping content will be omitted for simplicity in the description.

The UE may receive the information notifying the TCI change from a first transmission reception point (TRP) within the network (S1520). Since a more detailed embodiment of this has already been described above (and will be described later on) in more detail, repeated description of overlapping content will be omitted for simplicity in the description.

The UE may perform physical downlink control channel (PDCCH) monitoring based on the information notifying the TCI change (S1530). Since a more detailed embodiment of this has already been described above (and will be described later on) in more detail, repeated description of overlapping content will be omitted for simplicity in the description.

Figure 16:
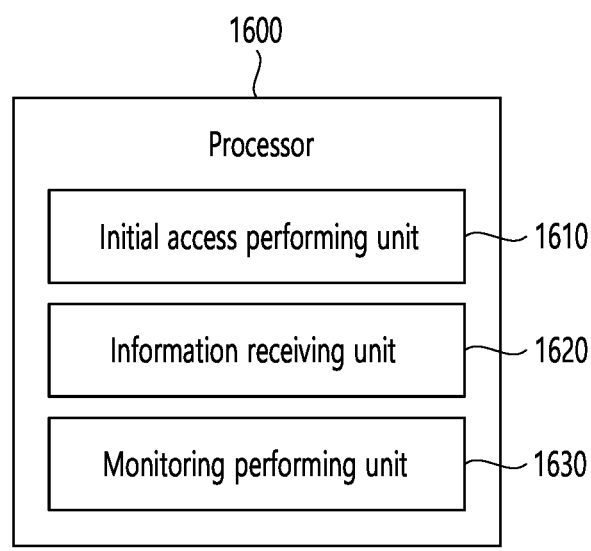
FIG. 16 is a block diagram of an exemplary device receiving information notifying Transmission Configuration Indicator (TCI) change, in view of the UE, according to an embodiment of the present specification.

FIG. 16 is a block diagram of an exemplary device receiving information notifying Transmission Configuration Indicator (TCI) change, in view of the UE, according to an embodiment of the present specification.

According to FIG. 16, a processor (1600) may include an initial access performing unit (1610), an information receiving unit (1620), and a monitoring performing unit (1630). Herein, the processor may correspond to a processor that will hereinafter be described with reference to FIG. 19 to FIG. 25.

The initial access performing unit (1610) may be configured to perform an initial access procedure with a network. Since a more detailed embodiment of this has already been described above (and will be described later on) in more detail, repeated description of overlapping content will be omitted for simplicity in the description.

The information receiving unit (1620) may be configured to control the transceiver, so as to be capable of receiving the information notifying the TCI change from a first transmission reception point (TRP) within the network. Since a more detailed embodiment of this has already been described above (and will be described later on) in more detail, repeated description of overlapping content will be omitted for simplicity in the description.

The monitoring performing unit (1630) may be configured to perform physical downlink control channel (PDCCH) monitoring based on the information notifying the TCI change. Since a more detailed embodiment of this has already been described above (and will be described later on) in more detail, repeated description of overlapping content will be omitted for simplicity in the description.

Meanwhile, although it is not separately illustrated, the present specification may also provide the embodiment described below.

According to an embodiment, a terminal (or user equipment (UE)) may include a transceiver, at least one memory, and at least one processor being operatively connected to the at least one memory and the transceiver, wherein the processor is configured to perform an initial access procedure with a network, to control the transceiver, so as to be capable of receiving the information notifying the TCI change from a first transmission reception point (TRP) within the network, and to perform physical downlink control channel (PDCCH) monitoring based on the information notifying the TCI change. Since a more detailed embodiment of this has already been described above (and will be described later on) in more detail, repeated description of overlapping content will be omitted for simplicity in the description.

According to another embodiment, a device may include at least one memory, and at least one processor being operatively connected to the at least one memory, wherein the processor is configured to perform an initial access procedure with a network, to control a transceiver, so as to be capable of receiving the information notifying the TCI change from a first transmission reception point (TRP) within the network, and to perform physical downlink control channel (PDCCH) monitoring based on the information notifying the TCI change. Since a more detailed embodiment of this has already been described above (and will be described later on) in more detail, repeated description of overlapping content will be omitted for simplicity in the description.

According to another embodiment, at least one computer readable medium including instructions being executed by at least one processor, wherein the at least one processor may be configured to perform an initial access procedure with a network, to control a transceiver, so as to be capable of receiving the information notifying the TCI change from a first transmission reception point (TRP) within the network, and to perform physical downlink control channel (PDCCH) monitoring based on the information notifying the TCI change. Since a more detailed embodiment of this has already been described above (and will be described later on) in more detail, repeated description of overlapping content will be omitted for simplicity in the description.

Meanwhile, content applying the above-described examples shall be described in view of the TRP as follows.

The following drawings have been illustrated to describe a detailed example of the present specification. The names of specific devices or names of specific signals/messages/fields being indicated in the drawing are merely presented as examples, and, therefore, the technical characteristics (or features) of the present specification will not be limited only to the detailed names used in the following drawings.

FIG. 17 is a flow chart of a method for receiving information notifying Transmission Configuration Indicator (TCI) change, in view of the TRP, according to an embodiment of the present specification.

According to FIG. 17, a TRP may transmit information notifying the TCI change to a terminal (or UE) (S1710). Herein, the information notifying the TCI change may be information notifying TCI that is being used for performing PDCCH monitoring by the UE. Since a more detailed embodiment of this has already been described above (and will be described later on) in more detail, repeated description of overlapping content will be omitted for simplicity in the description.

Figure 18:
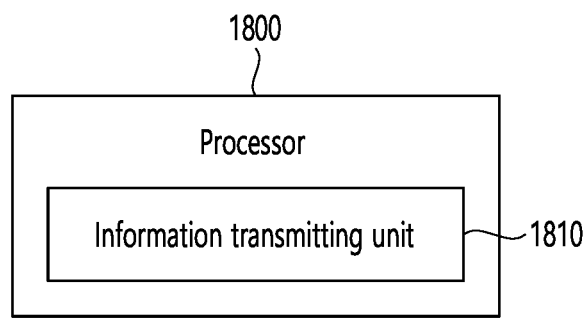
FIG. 18 is a block diagram of an exemplary device receiving information notifying Transmission Configuration Indicator (TCI) change, in view of the TRP, according to an embodiment of the present specification.

FIG. 18 is a block diagram of an exemplary device receiving information notifying Transmission Configuration Indicator (TCI) change, in view of the TRP, according to an embodiment of the present specification.

According to FIG. 18, a processor may include an information transmitting unit (1810). Herein, the processor may correspond to a processor that will hereinafter be described with reference to FIG. 19 to FIG. 25.

The information transmitting unit (1810) may be configured to control a transceiver so as to transmit information notifying the TCI change to a terminal (or UE). Herein, the information notifying the TCI change may be information notifying TCI that is being used for performing PDCCH monitoring by the UE. Since a more detailed embodiment of this has already been described above (and will be described later on) in more detail, repeated description of overlapping content will be omitted for simplicity in the description.

Figure 19:
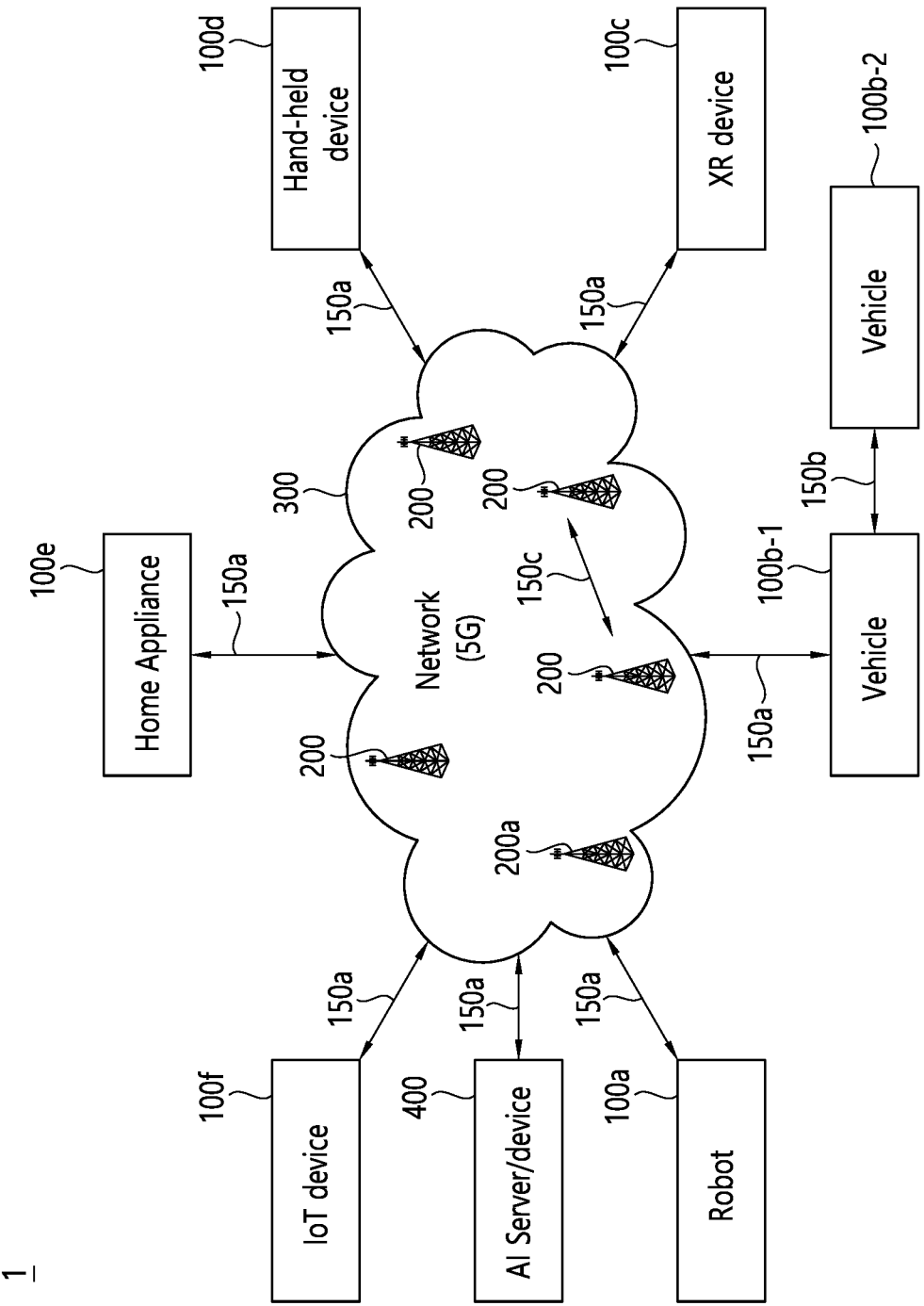
FIG. 19 shows an exemplary communication system (1), according to an embodiment of the present specification.

FIG. 19 shows an exemplary communication system (1), according to an embodiment of the present specification.

Referring to FIG. 19, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/ server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/ Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

Herein, the wireless communication technology that is implemented in a wireless device of the present specification may include Narrowband Internet of Things (NB-IoT) for LTE, NR, and 6G, as well as low-power communication. At this point, for example, the NB-IoT technology may be an example of Low Power Wide Area Network (LPWAN) technology and may be implemented according to the LTE Cat NB1 and/or LTE Cat NB2 standard(s), this technology will not be limited only to the above-mentioned name (or term). Additionally or alternatively, the wireless communication technology that is implemented in a wireless device of the present specification may perform communication based on the LTE-M technology. At this point, for example, the LTE-M technology may be an example of the LPWAN technology, and this technology may be referred to as various terms, such as enhanced Machine Type Communication (eMTC), and so on. For example, the LTE-M technology may be implemented according to at least one of various standards, such as 1) LTE CAT 0, 2) LTE Cat M1, 3) LTE Cat M2, 4) LTE non-Bandwidth Limited (non-BL), 5) LTE-MTC, 6) LTE Machine Type Communication, and/ or 7) LTE M, and so on, and the name of this technology will not be limited only to the above-mentioned names (or terms). Additionally or alternatively, the wireless communication technology that is implemented in a wireless device of the present specification may include at least one of ZigBee, Bluetooth, and Low Power Wide Area Network (LPWAN) considering low-power communication, and the name of this technology will not be limited only to the above-mentioned names (or terms). For example, the ZigBee technology may generate personal area networks (PANs) related to small-sized/low-power digital communication based on various standards, such as IEEE 802.15.4, and so on, and this technology may also be referred to as various other terms.

The wireless devices (100a~100f) may be connected to the network (300) via the BSs (200). An Artificial Intelligence (AI) technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/ receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Hereinafter, an example of wireless devices to which the present specification is applied will be described in detail.

Figure 20:
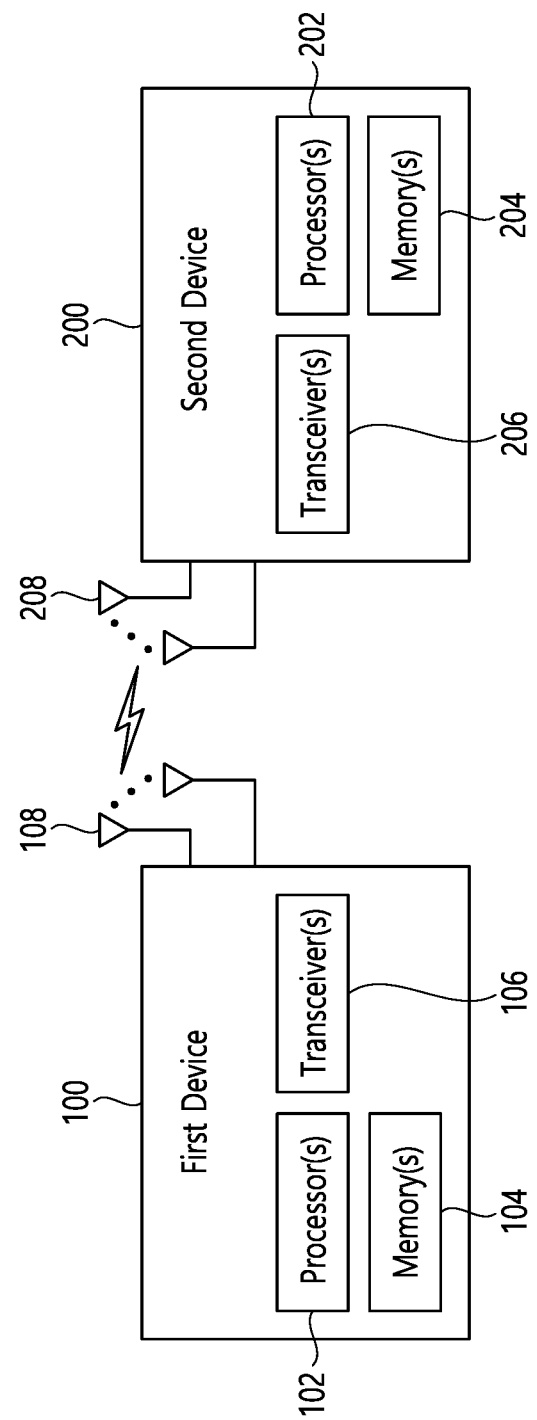
FIG. 20 shows an exemplary wireless device to which the present specification can be applied.

FIG. 20 shows an exemplary wireless device to which the present specification can be applied.

Referring to FIG. 20, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 19.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 21:
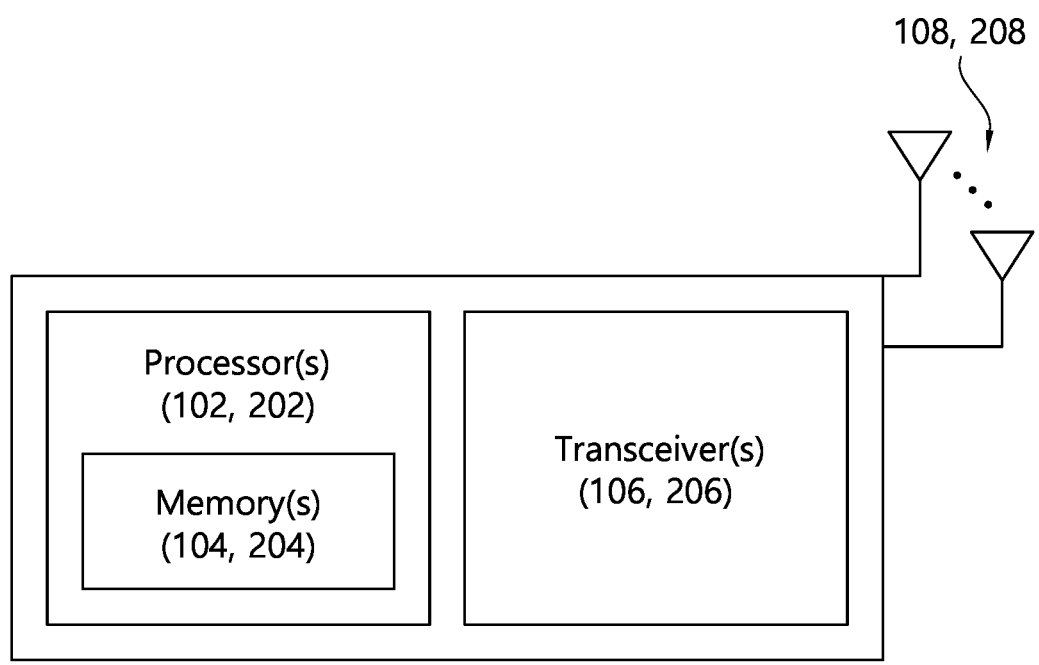
FIG. 21 shows another exemplary wireless device to which the present specification can be applied.

FIG. 21 shows another exemplary wireless device to which the present specification can be applied.

According to FIG. 21, the wireless device may include may include at least one processor (102, 202), at least one memory (104, 204), at least one transceiver (106, 206), and at least one antenna (108, 208).

A difference between the above-described exemplary wireless device of FIG. 20 and the exemplary wireless device of FIG. 21 is that the processors (102, 202) and the memories (104, 204) of FIG. 20 are separated, and that the at least one memory (104, 204) is included in the at least one processor (102, 202) in the example of FIG. 21.

Herein, since the detailed description of the processors (102, 202), memories (104, 204), transceivers (106, 206), and one or more antennas (108, 208) is the same as the description presented above, in order to avoid unnecessary repetition of the description, overlapping description will be omitted for simplicity.

Hereinafter, an example of a signal processing circuit to which the present specification is applied will be described in detail.

Figure 22:
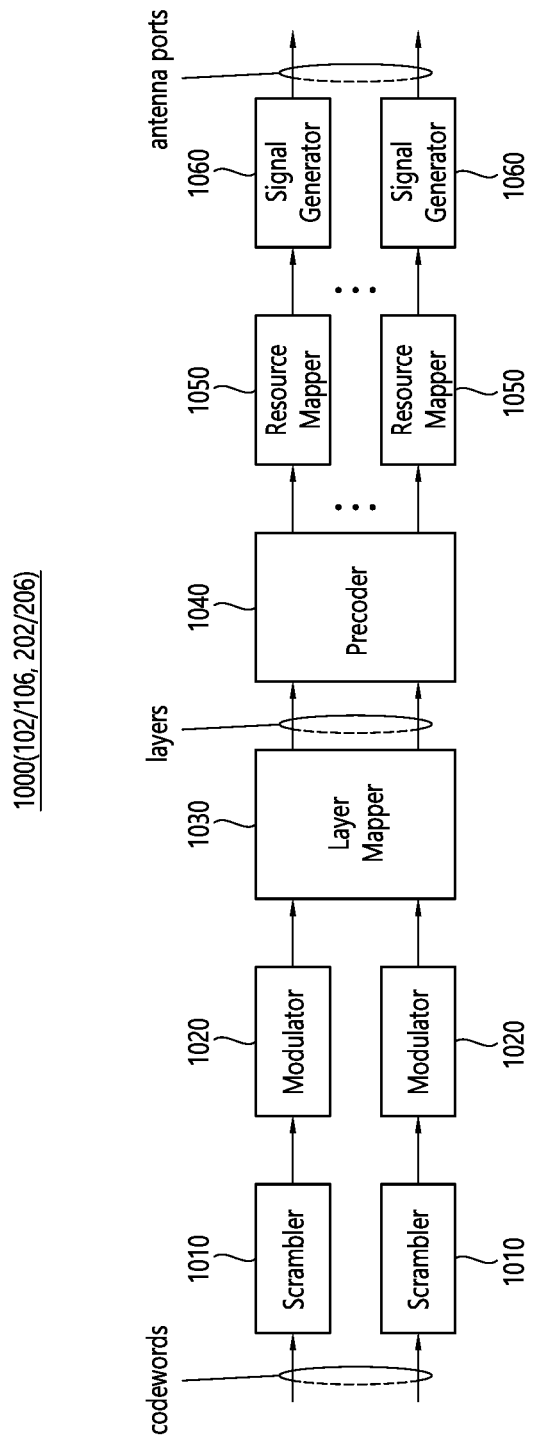
FIG. 22 shows a signal process circuit for a transmission signal according to an embodiment of the present specification.

FIG. 22 shows a signal process circuit for a transmission signal according to an embodiment of the present specification.

Referring to FIG. 22, a signal processing circuit (1000) may include scramblers (1010), modulators (1020), a layer mapper (1030), a precoder (1040), resource mappers (1050), and signal generators (1060). An operation/function of FIG. 22 may be performed, without being limited to, the processors (102, 202) and/or the transceivers (106, 206) of FIG. 20. Hardware elements of FIG. 22 may be implemented by the processors (102, 202) and/or the transceivers (106, 206) of FIG. 20. For example, blocks 1010~1060 may be implemented by the processors (102, 202) of FIG. 20. Alternatively, the blocks 1010~1050 may be implemented by the processors (102, 202) of FIG. 20 and the block 1060 may be implemented by the transceivers (106, 206) of FIG. 20.

Codewords may be converted into radio signals via the signal processing circuit (1000) of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 22. For example, the wireless devices (e.g., 100, 200 of FIG. 20) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 23:
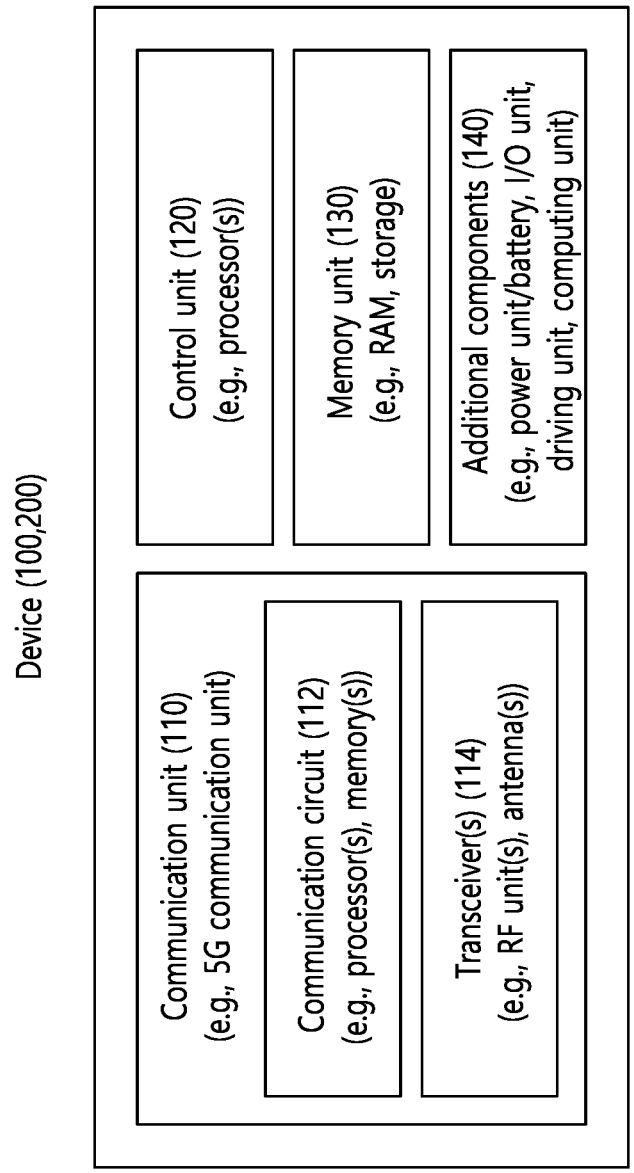
FIG. 23 shows another example of a wireless device according to an embodiment of the present specification.

FIG. 23 shows another example of a wireless device according to an embodiment of the present specification. The wireless device may be implemented in various forms according to a use-case/service (refer to FIG. 19).

Referring to FIG. 23, wireless devices (100, 200) may correspond to the wireless devices (100, 200) of FIG. 20 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 20. For example, the transceiver(s) (114) may include the one or more transceivers (106, 206) and/or the one or more antennas (108, 208) of FIG. 20. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100*a* of FIG. 19), the vehicles (100*b*-1, 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, and so on. The wireless device may be used in a mobile or fixed place according to a usage-example/service.

In FIG. 23, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
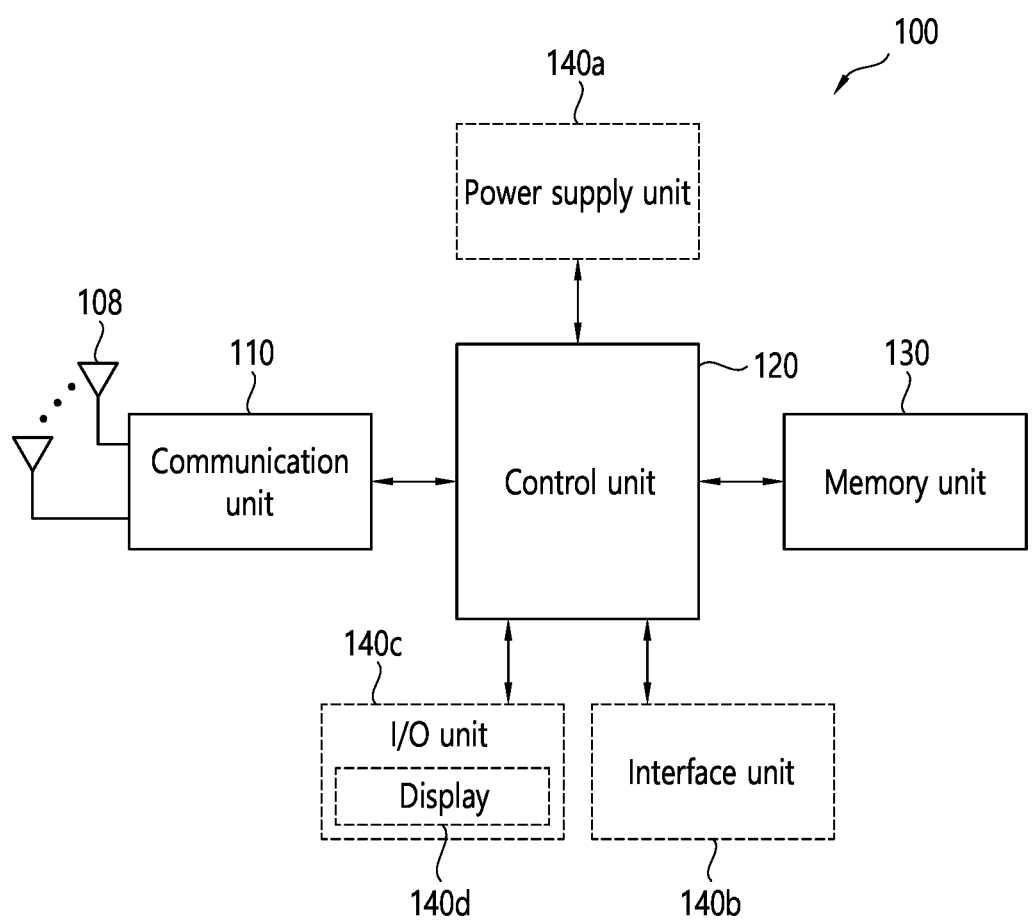
FIG. 24 shows a hand-held device to which the present specification is applied.

FIG. 24 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 23, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 25:
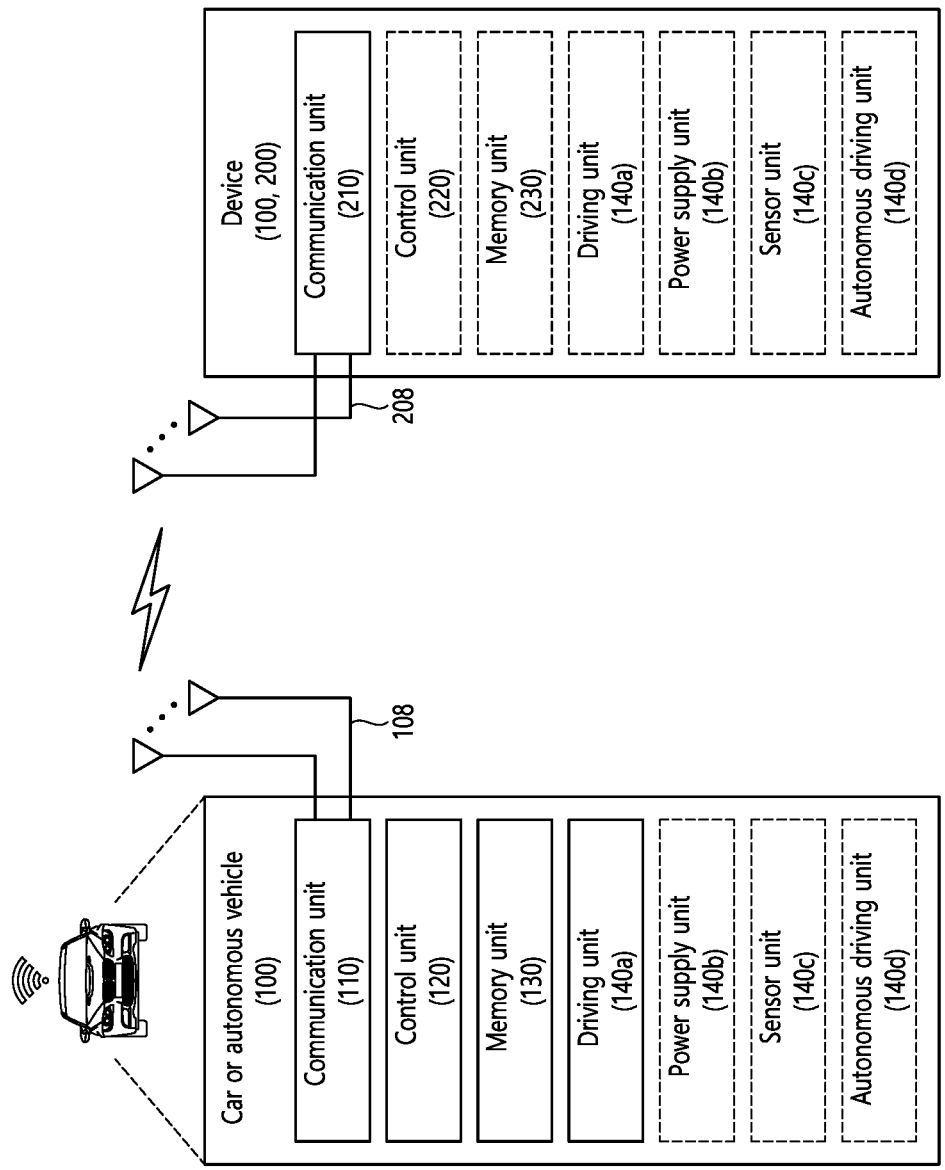
FIG. 25 shows a vehicle or an autonomous vehicle to which the present specification is applied.

FIG. 25 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 25, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 23, respectively.

The communication unit (110) may transmit and receive signals (e.g., data and control signals) to and from external devices such as other vehicles, BS s (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method performed by a terminal in a wireless communication system, the method comprising:
    establishing a radio resource control (RRC) connection with a network,
    wherein, based on establishing the RRC connection, the terminal is in a RRC connected state,
    wherein, prior to establishing the RRC connection, the terminal is in a RRC idle state;
    performing a physical downlink control channel (PDCCH) monitoring with a first transmission reception point (TRP) within the network based on a first TCI;
    receiving, from the first TRP within the network, information notifying a Transmission Configuration Indicator (TCI) change from the first TCI to a second TCI; and
    performing the PDCCH monitoring with a second TRP within the network based on the second TCI after receiving the information notifying the TCI change,
    wherein the first TRP and the second TRP have a same cell ID, and
    wherein the first TRP has an uplink-downlink resource allocation being different from an uplink-downlink resource allocation of the second TRP.

2. The method of claim 1, wherein the terminal receives the information notifying the TCI change based on downlink control information (DCI).

3. The method of claim 1, wherein the terminal performs the PDCCH monitoring on a search space associated with the TCI.

4. A terminal comprising:
    a transceiver;
    at least one memory; and
    at least one processor being operatively connected to the at least one memory and the transceiver,
    wherein the at least one processor:
    establishes a radio resource control (RRC) connection with a network,
    wherein, based on establishing the RRC connection, the terminal is in a RRC connected state,
    wherein, prior establishing the RRC connection, the terminal is in a RRC idle state;
    performs a physical downlink control channel (PDCCH) monitoring with a first transmission reception point (TRP) within the network based on a first TCI;
    receives, from the first TRP within the network, information notifying a Transmission Configuration Indicator (TCI) change from the first TCI to a second TCI; and
    performs the PDCCH monitoring with a second TRP within the network based on the second TCI after receiving the information notifying the TCI change,
    wherein the first TRP and the second TRP have a same cell ID, and
    wherein the first TRP has an uplink-downlink resource allocation being different from an uplink-downlink resource allocation of the second TRP.

5. A device, comprising:
    at least one memory; and
    at least one processor being operatively connected to the at least one memory,
    wherein the at least one processor:
    establishes a radio resource control (RRC) connection with a network,
    wherein, based on establishing the RRC connection, the device is in a RRC connected state,
    wherein, prior to establishing the RRC connection, the device is in a RRC idle state;
    performs a physical downlink control channel (PDCCH) monitoring with a first transmission reception point (TRP) within the network based on a first Transmission Configuration Indicator (TCI);
    receives, from the first TRP within the network, information notifying a TCI change from the first TCI to a second TCI; and
    performs the PDCCH monitoring with a second TRP within the network based on the second TCI after receiving the information notifying the TCI change,
    wherein the first TRP and the second TRP have a same cell ID, and
    wherein the first TRP has an uplink-downlink resource allocation being different from an uplink-downlink resource allocation of the second TRP.

6. At least one non-transitory computer readable medium including instructions for causing at least one processor to perform a method, the method comprising:
    establishing a radio resource control (RRC) connection with a network,
    wherein, based on establishing the RRC connection, the at least one processor is in a RRC connected state,
    wherein, prior to establishing the RRC connection, the at least one processor is in a RRC idle state;
    performing a physical downlink control channel (PDCCH) monitoring with a first transmission reception point (TRP) within the network based on a first Transmission Configuration Indicator (TCI);
    receiving, from the first TRP within the network, information notifying a TCI change from the first TCI to a second TCI; and
    performing the PDCCH monitoring with a second TRP within the network based on the second TCI after receiving the information notifying the TCI change,
    wherein the first TRP and the second TRP have a same cell ID, and
    wherein the first TRP has an uplink-downlink resource allocation being different from an uplink-downlink resource allocation of the second TRP.

* * * * *